US008390898B2

(12) United States Patent
Mizutani

(10) Patent No.: US 8,390,898 B2

(45) Date of Patent: Mar. 5, 2013

(54) IMAGE RECORDING APPARATUS

(75) Inventor: Shunsuke Mizutani, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 435 days.

(21) Appl. No.: 12/645,464

(22) Filed: Dec. 22, 2009

(65) Prior Publication Data

US 2010/0238475 A1 Sep. 23, 2010

(30) Foreign Application Priority Data

Dec. 25, 2008 (JP) ................................ 2008-329595

(51) Int. Cl.
*H04N 1/00* (2006.01)

(52) U.S. Cl. ......................................... 358/440; 347/16

(58) Field of Classification Search ........................ None
See application file for complete search history.

(56) References Cited

U.S. PATENT DOCUMENTS

| | | | | |
|---|---|---|---|---|
| 6,205,297 | B1 * | 3/2001 | Tachibana et al. | 399/21 |
| 2007/0076036 | A1 * | 4/2007 | Koga et al. | 347/16 |
| 2007/0201935 | A1 * | 8/2007 | Mizutani | 400/624 |
| 2007/0228649 | A1 * | 10/2007 | Mizutani et al. | 271/314 |
| 2008/0080923 | A1 * | 4/2008 | Yasue et al. | 400/642 |
| 2008/0100877 | A1 * | 5/2008 | Inoue | 358/440 |
| 2008/0240823 | A1 * | 10/2008 | Asada | 399/401 |
| 2008/0240824 | A1 * | 10/2008 | Asada | 399/405 |
| 2009/0250863 | A1 * | 10/2009 | Hirate et al. | 271/4.1 |

FOREIGN PATENT DOCUMENTS

| | | | |
|---|---|---|---|
| JP | H09-104141 | A | 4/1997 |
| JP | H11-065185 | A | 3/1999 |
| JP | 2000-159392 | A | 6/2000 |
| JP | 2008-087204 | A | 4/2008 |
| JP | 2008-247495 | A | 10/2008 |
| JP | 2008-247537 | A | 10/2008 |

OTHER PUBLICATIONS

Japan Patent Office, Notice of Reasons for Rejection for Japanese Patent Application No. 2008-329595 (counterpart to above-captioned patent application), mailed Sep. 14, 2010. The State Intellectual Property Office of the People'S Republic of China, Notification of First Office Action for Chinese Patent Application No. 200910262665.9 (counterpart to above-captioned patent application), issued Mar. 14, 2011.

* cited by examiner

*Primary Examiner* — Twyler Haskins
*Assistant Examiner* — Helen Q Zong
(74) *Attorney, Agent, or Firm* — Baker Botts L.L.P.

(57) ABSTRACT

An image recording apparatus includes a sheet feed tray, a sheet feed roller, an image recording unit, an output unit, a first conveying unit configured to convey a recording medium from the sheet feed tray to the output unit via the image recording unit, and a second conveying unit configured to return the recording medium, which has conveyed via the image recording unit, to the sheet feed tray. The image recording medium further includes an image memory configured to store image data to be recorded by the image recording unit and a controller configured to control the sheet feed roller, the image recording unit, the first conveying unit, and the second conveying unit to record the image on the recording medium. The controller is configured to control the sheet feed roller to start feeding a following recording medium subsequent to a preceding recording medium fed by the sheet feed roller irrespective of whether or not the image data for the following recording medium is stored in the image memory. The controller is further configured to, when it is determined that there is no image data stored therein, return the following recording medium to the sheet feed tray via the image recording unit and via the second conveying unit.

9 Claims, 28 Drawing Sheets

Fig. 17A
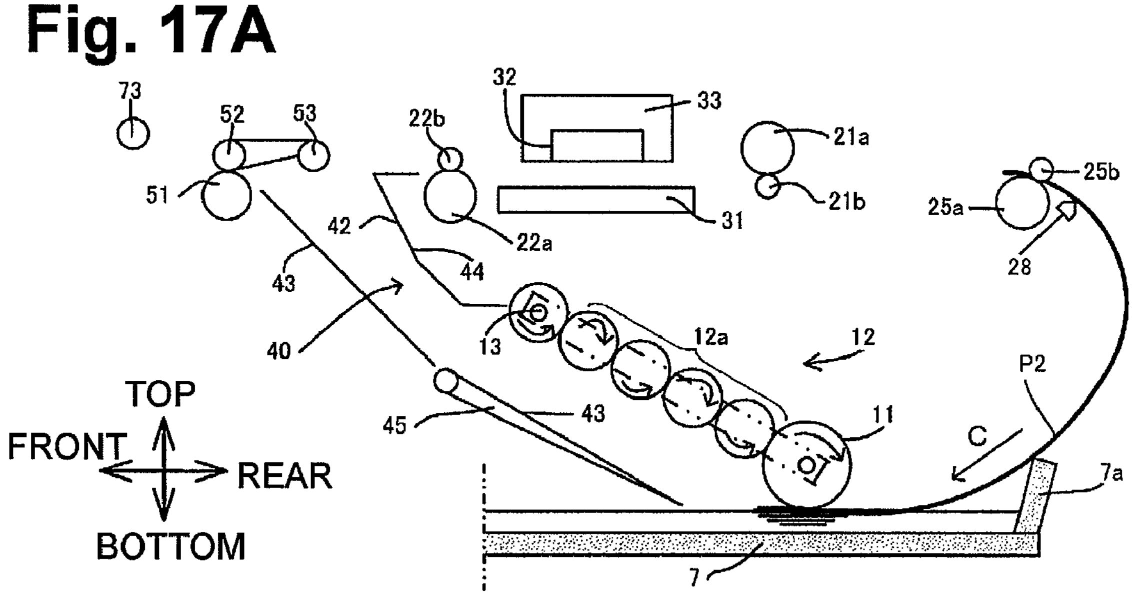
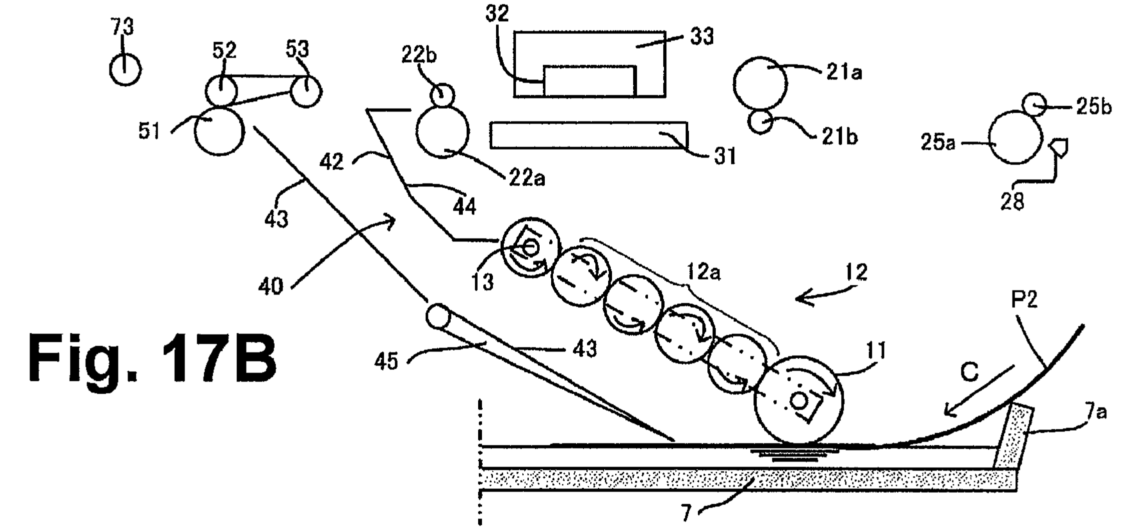
Fig. 17B
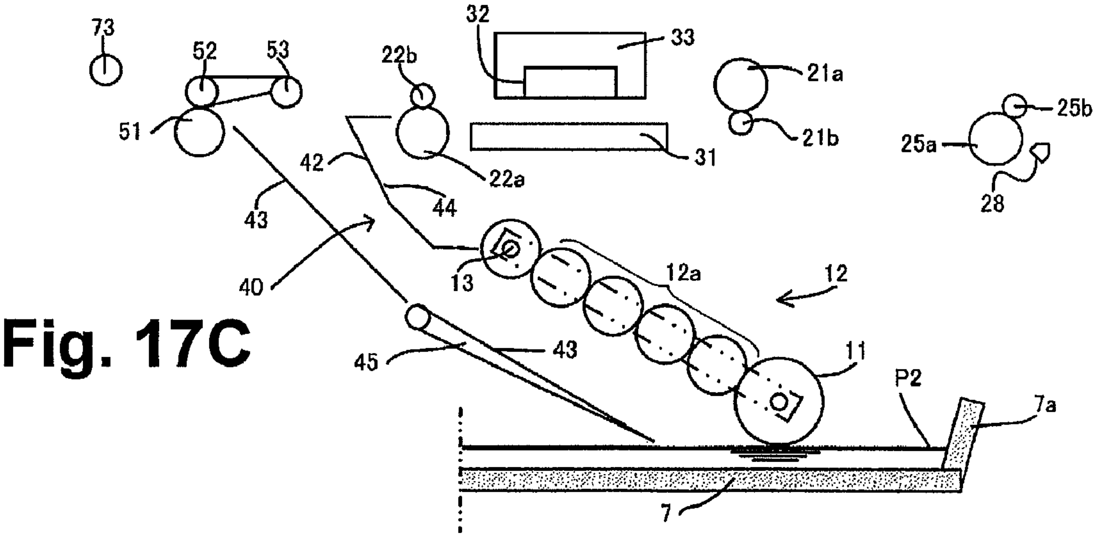
Fig. 17C

IMAGE RECORDING APPARATUS

CROSS REFERENCE TO RELATED APPLICATION

The present application claims priority from Japanese Patent Application No. 2008-329595, filed on Dec. 25, 2008, the disclosure of which is incorporated herein by reference in its entirety.

BACKGROUND

1. Technical Field

The present invention is related generally to an image recording apparatus which feeds a plurality of recording medium continuously.

2. Related Art

In the image recording apparatus in the related art, a sheet feeding operation is performed while securing an adequate distance between a preceding sheet and a following sheet when feeding sheets from a sheet feed tray having a plurality of sheets stacked thereon to a sheet conveying path separately one by one. In the case of the image recording apparatus as described above, if no image data is present for the following sheet to be recorded, the following sheet remains in the sheet conveying path after having executed the image recording on the preceding sheet. As an example of a countermeasure against the remaining sheet, an image recording apparatus is known which is configured to return the remaining sheet to the sheet feed tray by rotating a sheet feed roller merely in a reverse direction opposite to a conveying direction when the image data for the following sheet is not present.

However, when small sized sheets (post cards or the like) are printed, or when a sheet remaining in the sheet conveying path is positioned further downstream, the sheet is not pressed by the sheet feed roller. Therefore, there is a probability that the sheet cannot be returned to the sheet feed tray, and remains in the sheet conveying path. Even when the remaining sheet is pressed by the sheet feed roller, when returning the remaining sheet, damage of the remaining sheet or a sheet on the sheet feed tray might be resulted due to, for example, a frictional force between the remaining sheet and the sheet on the sheet feed tray in a specific environment or in the case of a specific sheet type. The longer the distance of returning the remaining sheet, the higher the probability of occurrence of damage may become.

SUMMARY

A need has arisen to provide an image recording apparatus which is capable of returning a sheet remaining in a sheet conveying path more stably back to a sheet feed tray.

According to one embodiment of the present invention, an image recording apparatus comprises a sheet feed tray configured to store a plurality of stacked recording medium and a sheet feed roller configured to feed the plurality of recording medium, one by one, from the sheet feed tray. The image recording apparatus further comprises an image recording unit configured to record an image on the recording medium fed by the sheet feed roller and an output unit configured to output the recording medium recorded by the image recording unit. The image recording apparatus still further comprises a first conveying unit configured to convey the recording medium from the sheet feed tray to the output unit via the image recording unit and a second conveying unit configured to return the recording medium, which has conveyed via the image recording unit, to the sheet feed tray. Moreover, the image recording apparatus comprises an image memory configured to store image data to be recorded by the image recording unit and a controller configured to control the sheet feed roller, the image recording unit, the first conveying unit, and the second conveying unit to record the image on the recording medium. The controller is configured to control the sheet feed roller to start feeding a following recording medium subsequent to a preceding recording medium fed by the sheet feed roller irrespective of whether or not the image data for the following recording medium is stored in the image memory. The controller is further configured to determine whether or not the image data for the following recording medium is stored in the image memory after having started the sheet feeding of the following recording medium and to, when it is determined that there is no image data stored in the memory, return the following recording medium to the sheet feed tray via the image recording unit and via the second conveying unit.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein:

FIGS. 17A to 17C are drawings showing the travel of the printing paper in the recording process executed by the image recording apparatus;

DESCRIPTION OF PREFERRED EMBODIMENTS

Embodiments of the invention and their features and advantages may be understood by referring to FIGS. 1-20F, like numerals being used for like corresponding parts in the various drawings. The image recording apparatus in the embodiment is a multifunctional apparatus having a number of functions such as a facsimile function, a printer function, a copying function, and a scanner function. However, the facsimile function and the scanner function do not necessarily have to be provided. One of the printer function and the copying function does not necessarily have to be provided as well. Terms "downstream" and "upstream" in the description given below means "downstream of the direction of conveyance of printing papers P", and "upstream of the direction of conveyance of printing papers P", respectively, unless otherwise specifically noted.

<Appearance Configurations>

Figure 1:
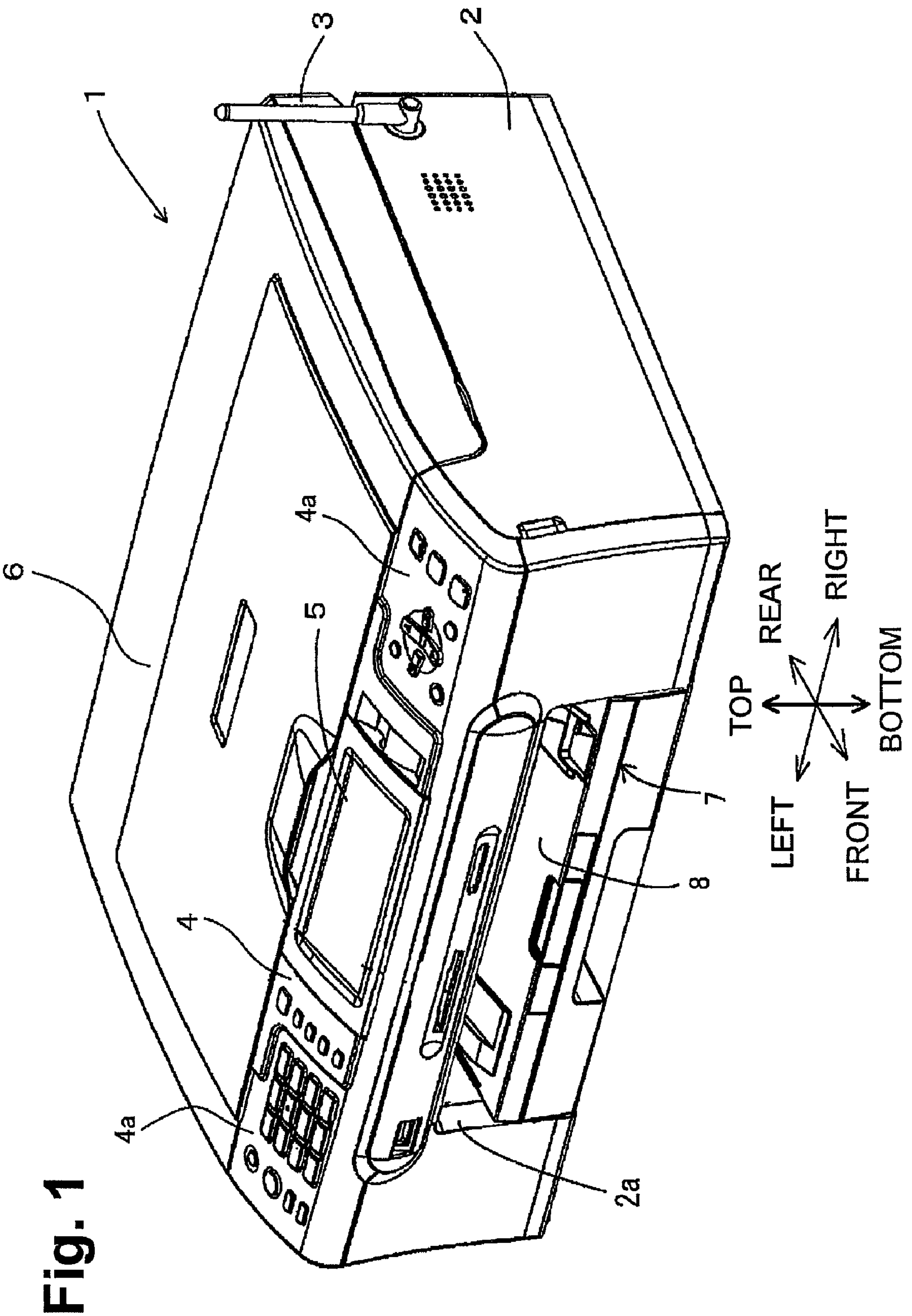
FIG. 1 is a perspective view showing an appearance configuration of an image recording apparatus according to an embodiment of the invention.

In the description given below, a front side of an image recording apparatus 1 shown in FIG. 1 is referred to as "front side", directions indicated by an arrow LEFT and RIGHT are referred to as "lateral direction", directions indicated by an arrow FRONT and REAR are referred to as "fore-and-aft direction", and directions indicated by an arrow TOP and BOTTOM is referred to as "vertical direction". As shown in FIG. 1, the image recording apparatus 1 is covered by a main body case 2 and an upper case 3. The main body case 2 is formed into a substantially box shape opening on the top. The upper case 3 is pivotably fitted to the rear side of the main body case 2 by a hinge or the like and is configured to be rotatable in the vertical direction.

An operation panel 4 is arranged on the top front of the main body case 2. The operation panel 4 includes various buttons such as numeric buttons, a start button, functional operation buttons provided thereon. By these buttons being pressed downward, various operations are performed. The operation panel 4 also includes a liquid crystal display (LCD) 5, which displays settings of the image recording apparatus 1, various messages, and the like. For example, the size of the printing paper is set by a user by operating the operation panel 4.

Arranged in the upper case 3 on the rear side of the operation panel 4 is a scanner unit 6, where an image of a document is scanned. For example, the scanner unit 6 scans a facsimile document to be sent to a destination facsimile apparatus when the facsimile function is in use, or an image of a document to be copied when the copying function is in use.

An opening 2*a* is provided the front side of the main body case 2. A sheet feed tray 7 and a sheet output tray 8 are provided inside the opening 2*a* above and below. A plurality of printing papers P (recording medium) are stored substantially horizontally in a stacked manner on a bottom of the sheet feed tray 7. Acceptable sizes of the printing paper P are, for example, A4 size and A5 size and, in addition, the sheets of A4 size may be stored with a longitudinal direction thereof oriented horizontally (laterally).

Figure 2:
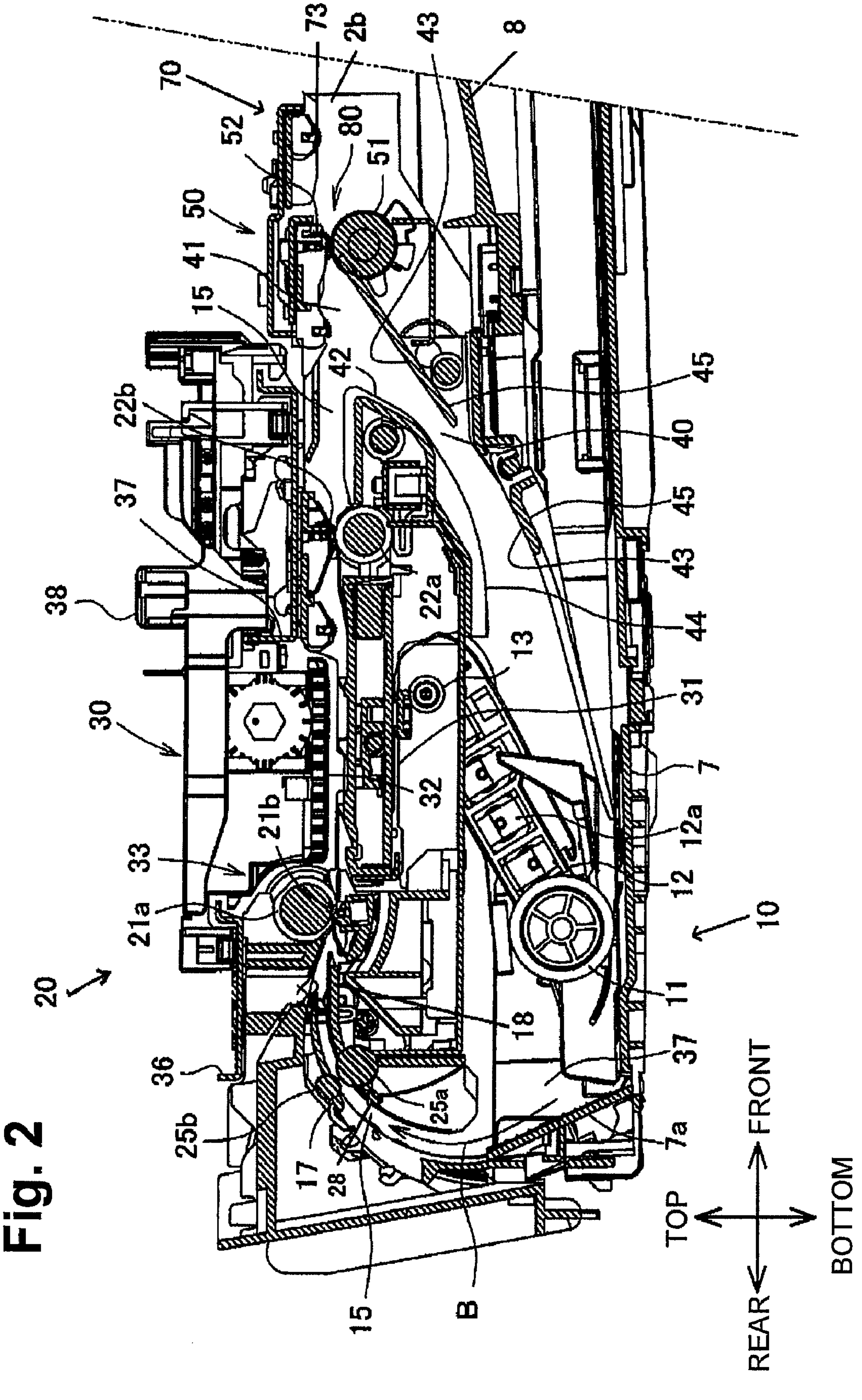
FIG. 2 is a vertical cross-sectional view showing an internal structure of the image recording apparatus.

As shown in FIG. 2, a separation inclined plate 7*a* is provided on the rear side of the sheet feed tray 7. The separation inclined plate 7*a* separates the plurality of printing papers P on the sheet feed tray 7 and guides a topmost printing paper P upward. The printing paper P guided upward is subjected to image recording by a recording mechanism 30, described later, and then output onto the sheet output tray 8.

<Internal Configurations>

Referring now to FIGS. 2 to 11, an internal configuration of the image recording apparatus 1 will be described. The image recording apparatus 1 includes a number of mechanisms such as a sheet feed mechanism 10, a transporting device 20, the recording mechanism 30, a returning section 40, a conveying path switching mechanism 50, and a guide portion 70 integrated therein.

Figure 3:
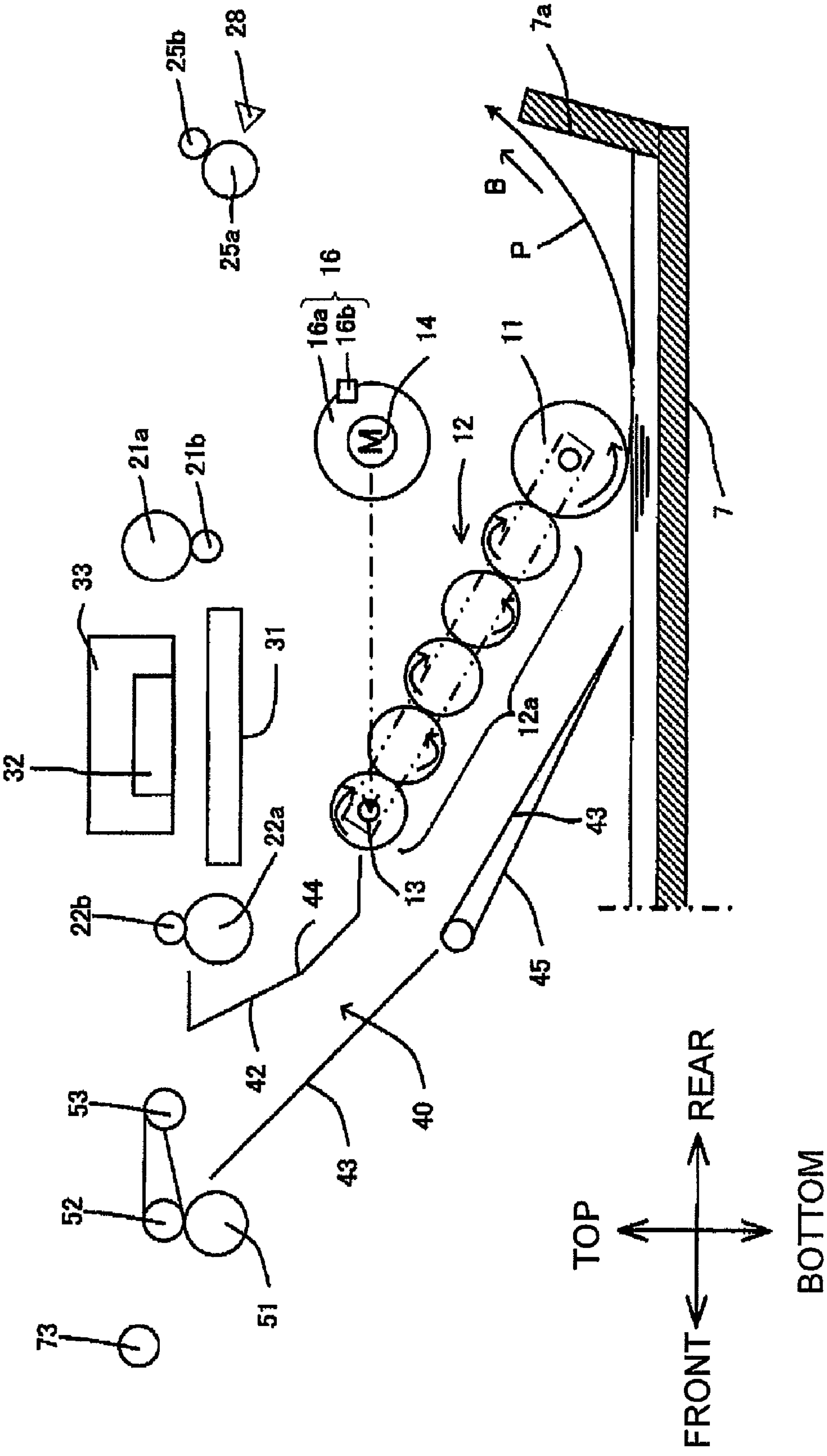
FIG. 3 is a schematic drawing showing a vertical cross-sectional view of the internal structure of the image recording apparatus.

Referring first to FIGS. 2 and 3, a configuration of the sheet feed mechanism 10 will be shown. As shown in FIG. 2, a sheet feed arm 12 in the sheet feed mechanism 10 is installed in the main body case 2 so as to be rotatable in the vertical direction about a drive shaft 13. A sheet feed roller 11 is rotatably supported at the distal end of the sheet feed arm 12. The sheet feed arm 12 rotates downward by its own weight or by being urged by a spring or the like so that the sheet feed roller 11 comes into contact with the sheet feed tray 7. The sheet feed roller 11 is then brought into press contact with the printing papers P on the sheet feed tray 7. A transmission gear mechanism 12*a* is provided in the sheet feed arm 12. The transmission gear mechanism 12*a* includes a plurality of engaging gears configured to transmit a rotating force from the drive shaft 13 to the sheet feed roller 11. As shown in FIG. 3, the sheet feed roller 11 is driven to rotate via the transmission gear mechanism 12*a* with a sheet feed motor 14 as a drive source.

Accordingly, when the sheet feed roller 11 rotates, a topmost printing paper is fed toward the separation inclined plate 7*a* by a frictional force generated between the sheet feed roller 11 and the printing paper P. When the leading edge of the printing paper P comes into abutment with the separation inclined plate 7*a*, the printing paper P is guided upward, and is fed to a conveying path 15 along a direction indicated by an arrow B. When the topmost printing paper P is fed by the sheet feed roller 11, a printing paper P immediately below may be fed together by the action of friction or static electricity. However, the printing paper P is arrested by an abutment with the separation inclined plate 7*a*.

The conveying path 15 is sectionalized and defined by an outer guide surface and an inner guide surface except for a position where the recording mechanism 30, described later, is disposed. For example, a curved portion of the conveying path 15 on the rear side of a multifunction peripheral is made up of an outer guide member 17 and an inner guide member 18 fixed to a main body frame 2*b*. In this case, the outer guide member 17 constitutes the outer guide surface, and the inner guide member 18 constitutes the inner guide surface. The outer guide member 17 and the inner guide member 18 are so arranged as to be opposed to each other at a predetermined distance.

As shown in FIG. 3, in the embodiment, the sheet feed roller 11 rotates by a rotating force from the sheet feed motor 14. A rotation of the sheet feed motor 14 which causes the printing paper P to be fed by the sheet feed roller 11 in the direction B is referred to as "normal rotation". In FIG. 3, a direction of rotation of the sheet feed roller 11 or the transmission gear mechanism 12*a* when the sheet feed motor 14 is in the normal rotation is indicated by a solid line.

A sheet feed encoder 16 is provided at an end of the sheet feed motor 14. The sheet feed encoder 16 is, for example, a rotary encoder, and includes a sheet feed rotary slit panel 16*a* having slits formed at predetermined intervals along the circumference thereof and a sheet feed optical sensor 16*b*. The sheet feed optical sensor 16*b* transforms light passing through the slits formed on the sheet feed rotary slit panel 16*a* into electric signals and outputs the same. Therefore, the slits of the sheet feed encoder 16 are detected by the electric signals from the sheet feed optical sensor 16*b*.

The sheet feed rotary slit panel 16*a* is configured to rotate coaxially with the sheet feed motor 14, and the rotation of the sheet feed motor 14 is transmitted to the sheet feed roller 11. Therefore, the amount of rotation of the sheet feed roller 11 is computed by counting the number of the detected slits on the sheet feed encoder 16. Accordingly, the position of the printing paper with respect to the sheet feed tray 7 is obtained.

For example, a DC motor may be used as the sheet feed motor 14, and a pulse motor may also be used. In this case, computation of the amount of rotation of the sheet feed roller 11 is achieved by counting the number of pulse outputs to the pulse motor.

Referring now to FIGS. 2 and 3, a configuration of the transporting device 20 will be described. As shown in FIG. 2, a conveying roller 21*a* configured to convey the printing paper P and a nip roller 21*b* configured to bring the printing paper P into press contact with the conveying roller 21*a* are disposed downstream of the sheet feed direction (the direction indicated by the arrow B) of the printing paper P being fed by the sheet feed mechanism 10. The conveying roller 21*a* and the nip roller 21*b* nip the printing paper P being conveyed in the conveying path 15 and convey the same onto a surface of a platen 31, described later.

A sheet output roller 22*a* and spur rollers 22*b* configured to brings the printing paper P after recording into press contact with the sheet output roller 22*a* are disposed downstream of the printing paper P being conveyed on the surface of the platen 31. The sheet output roller 22*a* and the spur rollers 22*b* nip the printing paper P after recording and convey the same from the conveying path 15 further downstream (toward the sheet output tray 8). In the embodiment, the conveying roller 21*a* and the sheet output roller 22*a* are driven by a conveying motor 23 shown in FIG. 12 as a drive source. Drive of the conveying roller 21*a* and the sheet output roller 22*a* are synchronized, and these members are intermittently driven when recording the image. Accordingly, the image recording on the printing paper P is achieved while the printing paper P is fed by line breaks at predetermined intervals.

Figure 12:
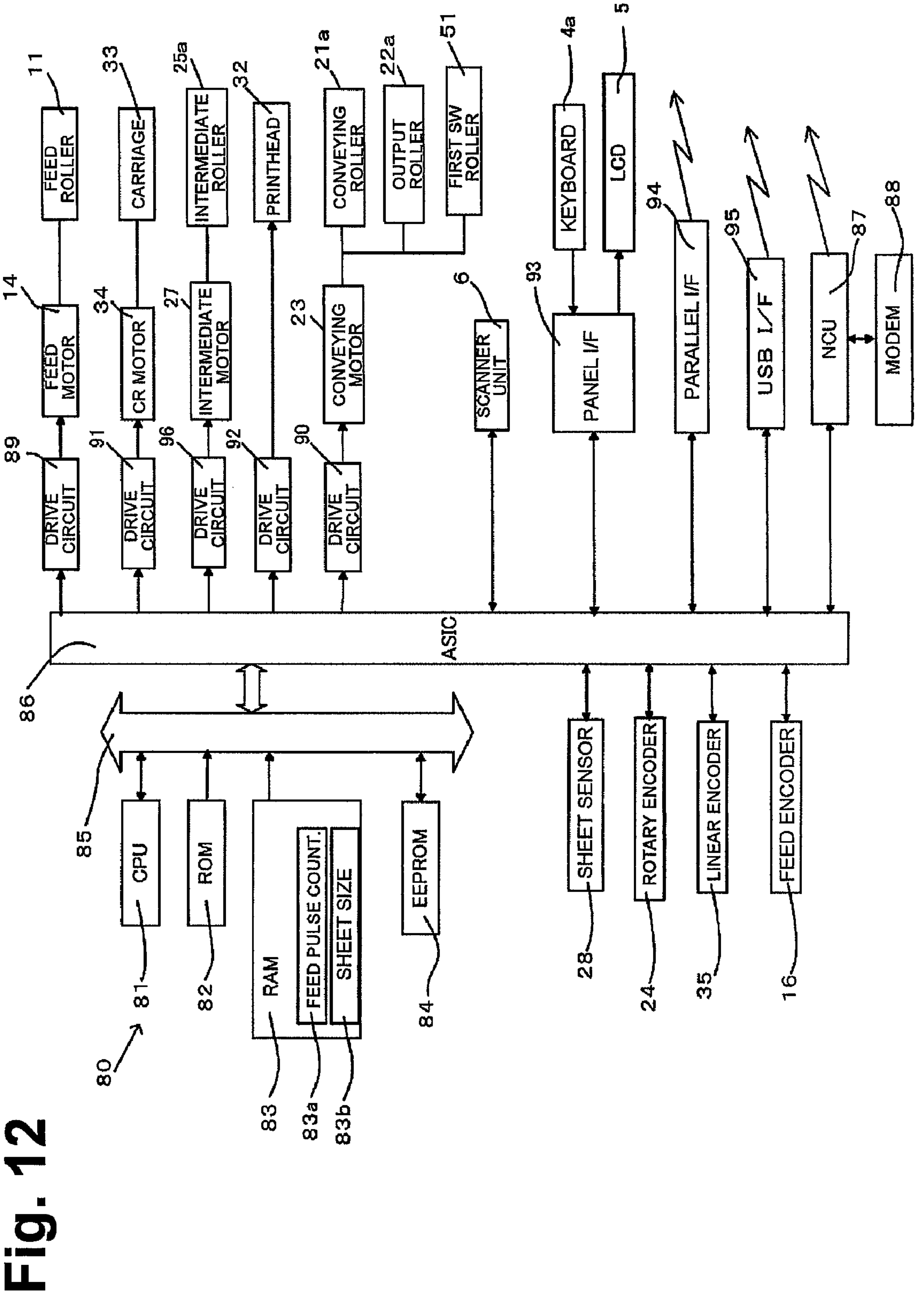
FIG. 12 is a block diagram showing an electric configuration of the image recording apparatus.

A rotary encoder 24 shown in FIG. 12 is provided at an end of the conveying roller 21*a*. The rotary encoder 24 includes a conveyance rotary slit panel having slits formed at predetermined intervals along the circumference thereof and rotating in association with the conveying roller 21*a* and a conveyance optical sensor. The conveyance optical sensor transforms light passing through the slits formed on the conveyance rotary slit panel into electric signals and outputs the same. The rotations of the conveying roller 21*a*, the sheet output roller 22*a*, and a first switching roller, described later, are controlled on the basis of the signals detected by the conveyance optical sensor. Before and after the image recording, the conveying roller 21*a* and the sheet output roller 22*a* are continuously driven, so that a quick sheet conveyance is achieved.

An intermediate roller 25*a* configured to convey the printing paper P and a driven roller 25*b* configured to bring the printing paper P into press contact with the intermediate roller 25*a* are disposed upstream from the position where the conveying roller 21*a* of the conveying path 15 is arranged. The intermediate roller 25*a* and the driven roller 25*b* nip the printing paper P being conveyed in the conveying path 15 and convey the same to the conveying roller 21. In the embodiment, the intermediate roller 25*a*, not shown in FIGS. 2 and 3, is driven by an intermediate motor 27 (see FIG. 12) as a drive source. Accordingly, the printing paper P is able to reach the conveying roller 21*a*.

A sheet sensor 28 is arranged in the conveying path 15 upstream from a position where the intermediate roller 25*a* is arranged. The sheet sensor 28 is turned ON when the printing paper P is detected, and is turned OFF when the printing paper P is not detected. Therefore, when a printing paper P is fed through the conveying path 15 toward the intermediate roller 25*a*, the leading edge and the trailing edge of the printing paper P are able to be detected.

Referring now to FIGS. 2 and 3, a configuration of the recording mechanism 30 will be described. As shown in FIG.

2, a printhead 32 is arranged above the platen 31 between the conveying roller 21*a* and the sheet output roller 22*a*. The printhead 32 is mounted on a carriage 33. The carriage 33 reciprocates in a primary scanning direction (direction vertical to a sheet plane in FIG. 2) along guide rails 36 and 37. More specifically, the carriage 33 reciprocates by a rotational driving of a CR motor 34 shown in FIG. 12. The main body frame 2*b* of the image recording apparatus 1 is provided with a linear encoder 35 shown in FIG. 12. The reciprocating motion of the carriage 33 is performed while detecting the position of the carriage 33 using the linear encoder 35. Nozzles (not shown) configured to output ink onto the printing paper P nipped by the conveying roller 21*a* or the like are formed on a lower surface of the printhead 32. An image is recorded on the printing paper P with ink output from the nozzles in association with the reciprocating motion of the carriage 33.

Ink is supplied from an ink tank (not shown) via an ink tube (not shown) to the printhead 32. The ink may be many color inks and may be a monochrome ink.

Recording is started by causing the ink from the nozzles of the printhead 32 to be output onto the printing paper P moving forward intermittently by the conveying roller 21*a* while causing the carriage 33 to reciprocate in the primary scanning direction. When the recording with respect to one piece of printing paper P is terminated, the printing paper P after the recording is conveyed downstream (toward the sheet output tray 8) via the conveying path 15 by the sheet output roller 22*a*.

Referring now to FIGS. 2 and 3, a configuration of the returning section 40 will be described. As shown in FIG. 2, the returning section 40 is connected to the conveying path 15. The returning section 40 is continued to a downstream portion 41 of the conveying path 15, which is located downstream from the recording mechanism 30. The returning section 40 constitutes a guide conveying path which is configured to guide the printing paper P conveyed by the sheet output roller 22*a* again onto the sheet feed tray 7 from the trailing edge thereof. The guide conveying path is sectionalized and defined by a first guide surface 42 and a second guide surface 43. In the embodiment, the first guide surface 42 and the second guide surface 43 are made up of surfaces of a guide member 44 and a guide member 45 arranged in the interior of the main body frame 2*b* of the image recording apparatus 1. The guide members 44 and 45 are arranged so as to oppose to each other at a predetermined distance, and the first guide surface 42 and the second guide surface 43 extend from the downstream portion 41 of the conveying path 15 obliquely downward toward the sheet feed roller 11.

As described later, when image data for a printing paper P2 following a printing paper P1 output after the image recording does not exist, the following printing paper P2 remaining in the conveying path 15 reaches a press-contact position of the sheet feed roller 11 on the sheet feed tray 7 via the returning section 40 from the trailing edge thereof. Therefore, the following printing paper P2 remaining in the conveying path 15 is returned onto the sheet feed tray 7 via the returning section 40 without being output onto the sheet output tray 8.

Figure 4:
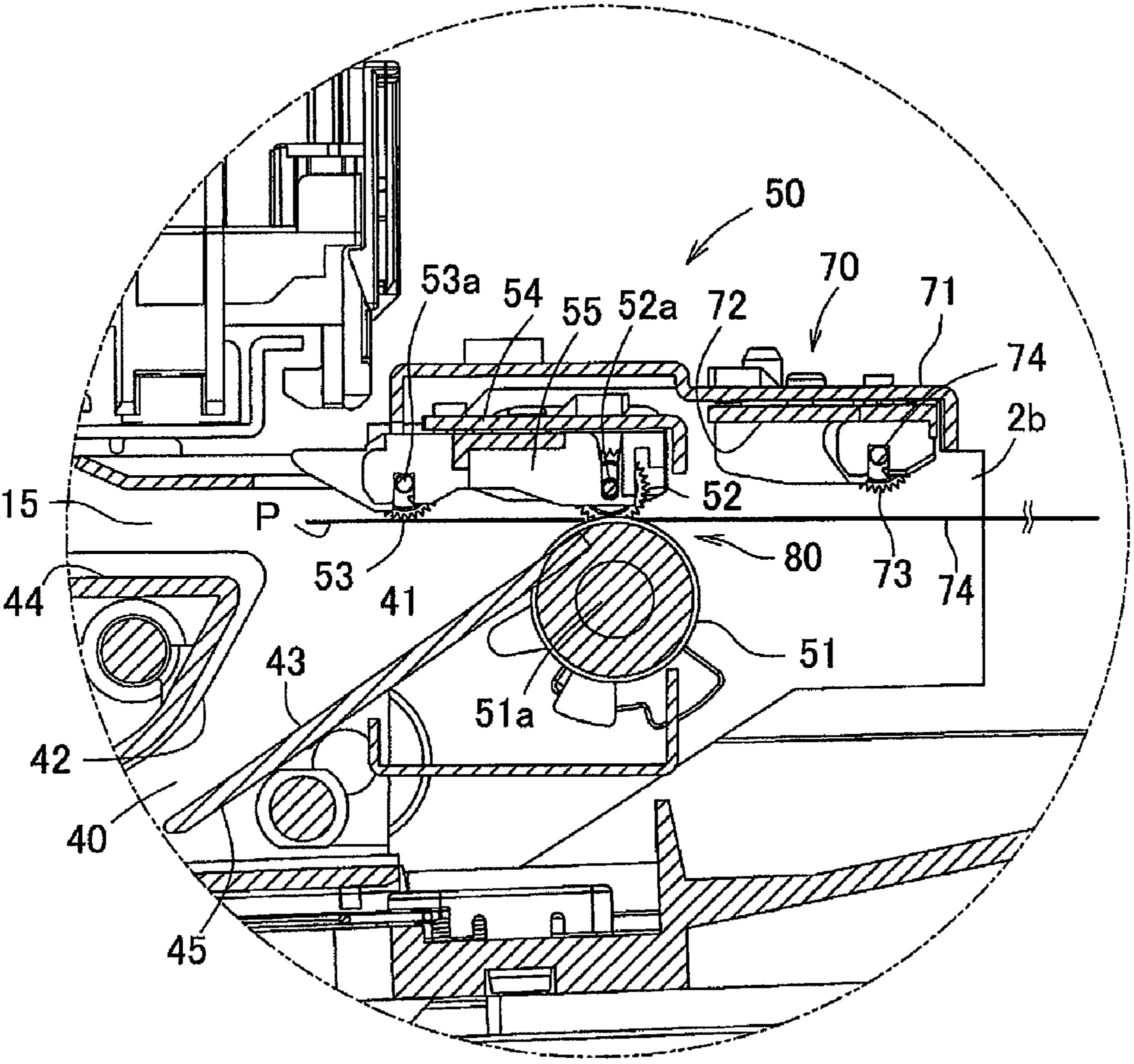
FIG. 4 is an enlarged view of a principal portion of the internal structure of the image recording apparatus.

As shown in FIGS. 2 to 4, the conveying path switching mechanism 50 is arranged in the conveying path 15 downstream from the recording mechanism 30. More specifically, the conveying path switching mechanism 50 is arranged at the downstream portion 41 of the conveying path 15, which is located downstream from the recording mechanism 30, that is, downstream in a boundary portion between the conveying path 15 and the returning section 40. The conveying path switching mechanism 50 includes a first switching roller 51 and second switching rollers 52 which constitute switching roller pairs, and auxiliary rollers 53 arranged in parallel to the second switching roller 52.

As described later, the first switching roller 51 and the second switching rollers 52 nip the printing paper P fed from the sheet output roller 22*a* and the spur rollers 22*b*. The first switching roller 51 and the second switching rollers 52 are configured to be able to convey the printing paper P further downstream (toward the sheet output tray 8) along the conveying path 15, and also to be able to convey the printing paper P to the returning section 40.

The second switching rollers 52 and the auxiliary rollers 53 are mounted on a frame 54. The frame 54 extends in the lateral direction of the image recording apparatus 1. However, the cross-sectional shape of the frame 54 is formed into a substantially L-shape as shown in FIG. 4 and, accordingly, a required flexural rigidity of the frame 54 is secured.

Figure 5:
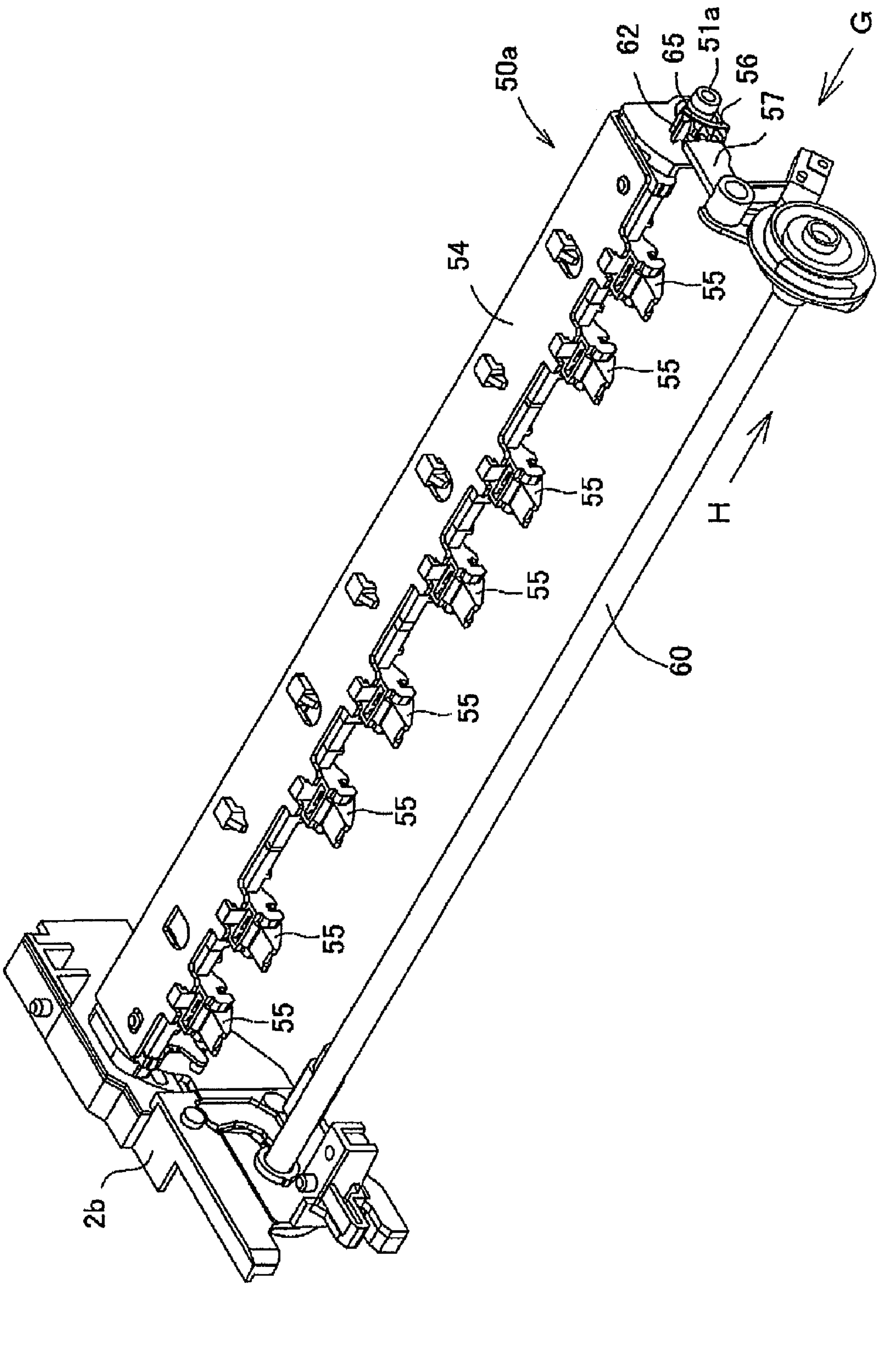
FIG. 5 is a perspective view of a drive mechanism of a conveying path switching mechanism of the image recording apparatus.

As shown in FIGS. 4 and 5, the frame 54 includes integrally-formed eight sub frames 55. The sub frames 55 are arranged in symmetry in the lateral direction with reference to a center of the image recording apparatus 1. The sub frames 55 each include one each of the second switching roller 52 and the auxiliary roller 53. Therefore, the frame 54 includes eight each of the second switching rollers 52 and the auxiliary rollers 53, and the second switching rollers 52 and the auxiliary rollers 53 are arranged in parallel to each other equidistantly in the direction orthogonal to the direction of conveyance of the printing paper P, that is, in the direction of the width of the printing paper P. The spur rollers 22*b* described above are also arranged in parallel to each other equidistantly in the direction of the width of the printing paper P. However, the spur rollers 22*b* are supported by a supporting structure similar to the second rollers 52.

As shown in FIG. 4, the second switching rollers 52 and the auxiliary rollers 53 are supported by supporting shafts 52*a* and 53*a* provided in the respective sub frames 55 so as to be rotatable about the supporting shafts 52*a* and 53*a*. In the embodiment, the second switching rollers 52 and the auxiliary rollers 53 are formed into a spur shape. The auxiliary rollers 53 are arranged upstream from the second switching rollers 52 by a predetermined distance. The second switching rollers 52 are each urged downward in FIG. 4 by a spring, not shown. Therefore, the second switching rollers 52 each are resiliently pressed constantly against the first switching roller 51.

The first switching roller 51 is rotated by the conveying motor 23 as a drive source. Although not shown in the drawings, the first switching roller 51 is connected to the conveying motor 23 via a required drive transmission mechanism. As shown in FIG. 5, the first switching roller 51 includes a center axis 51*a*. The drive transmission mechanism described above is connected to the center axis 51*a*. Required brackets may be provided on the center axis 51*a*. The center axis 51*a* is reliably supported by the main body frame 2*b* by the bracket being secured to the main body frame 2*b*, for example, with a screw.

The second switching rollers 52 are placed on the first switching roller 51. The first switching roller 51 may be formed into a single elongated column shape, and may be made up of eight rollers arranged so as to oppose the respective second switching rollers 52. The first switching roller 51 is brought into a normal rotation or a reverse rotation by the conveying motor 23. The printing paper P conveyed along the conveying path 15 is nipped between the first switching roller 51 and the second switching rollers 52. When the first switching roller 51 is brought into the normal rotation, the printing paper P is conveyed downstream while being nipped between the first switching roller 51 and the second switching rollers 52, and is output onto the sheet output tray 8. In the embodiment, the outer diameter of the first switching roller 51 is set to be slightly larger than the outer diameter of the sheet output roller 22*a*. In other words, when the both members are driven at the same speed of rotation, the peripheral velocity of the first switching roller 51 is larger than the peripheral velocity of the sheet output roller 22*a*. Therefore, when the printing paper P is conveyed by both of the sheet output roller 22*a* and the first switching roller 51, the printing paper P is constantly pulled in the direction of conveyance.

Figure 6:
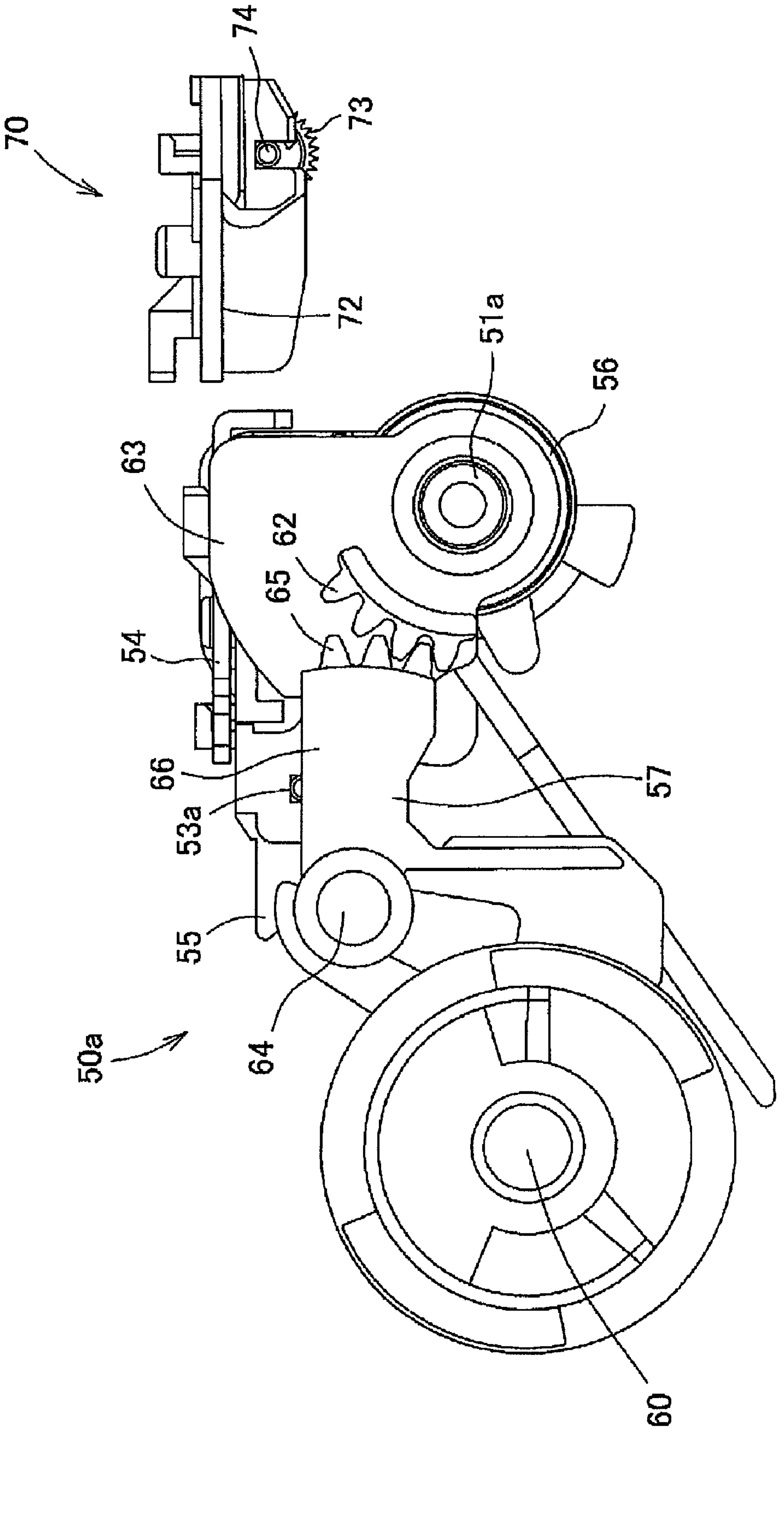
FIG. 6 is a drawing viewed in a direction indicated by an arrow G in FIG. 5.
Figure 7:
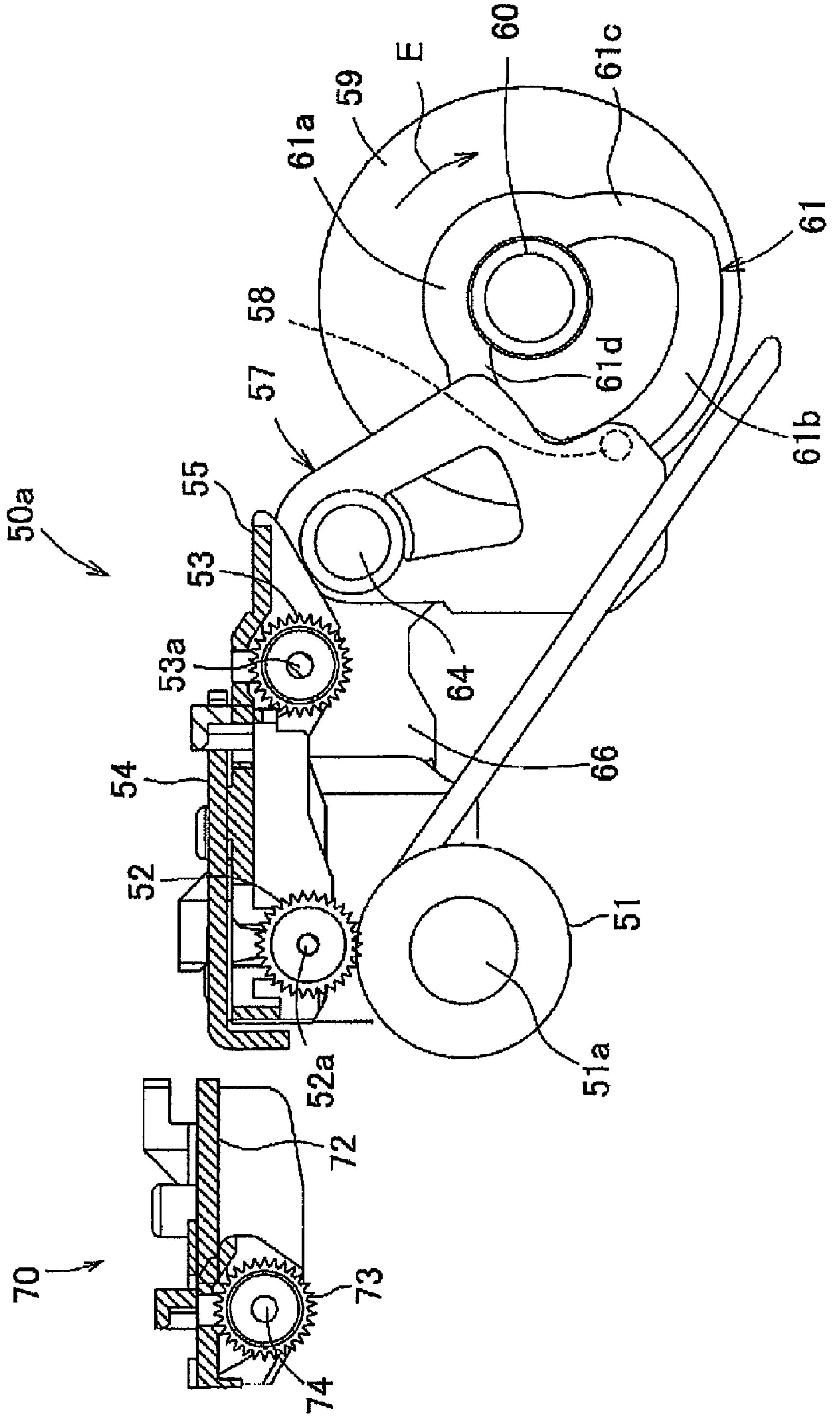
FIG. 7 is a drawing viewed in a direction indicated by an arrow H in FIG. 5, partly in cross section.

As shown in FIGS. 5 to 7, a drive mechanism 50*a* of the conveying path switching mechanism 50 includes a driven gear 56 provided on the center axis 51*a*, a drive gear 57 engaging the driven gear 56, and a cam 59 to which the drive gear 57 is coupled via a pin 58. The cam 59 includes a rotary drive shaft 60, and the rotary drive shaft 60 is driven by the conveying motor 23 as a drive source. As shown in FIG. 7, the cam 59 is provided with a guide groove 61. The guide groove 61 is formed into an annular shape about the rotary drive shaft 60. The guide groove 61 includes a small arcuate portion 61*a* and a large arcuate portion 61*b* each having the rotary drive shaft 60 at the center, a connecting groove 61*c* connecting one end of the small arcuate portion 61*a* and one end of the large arcuate portion 61*b*, and a connecting groove 61*d* connecting the other end of the small arcuate portion 61*a* and the other end of the large arcuate portion 61*b*. The pin 58 is fitted to the guide groove 61, and is freely slidable along the guide groove 61.

As shown in FIG. 5 FIG. 6, the driven gear 56 includes a first tooth portion 62 and a flange portion 63. The first tooth portion 62 is configured as an involute gear having the center axis 51*a* at the center. The first tooth portion 62 is fitted on the center axis 51*a*, and is configured to be able to rotate about the center axis 51*a*. The flange portion 63 is formed integrally with the first tooth portion 62, and is connected to the frame 54. Therefore, when the first tooth portion 62 rotates, the frame 54, the sub frame 55, the second switching rollers 52, and the auxiliary rollers 53 rotate integrally about the center axis 51*a*.

The drive gear 57 is rotatably supported by a supporting shaft 64. The supporting shaft 64 is provided on the main body frame 2*b*. The drive gear 57 includes a second tooth portion 65 and an arm 66, and the pin 58 is formed on the arm 66 so as to project therefrom. The second tooth portion 65 is configured as an involute gear having the supporting shaft 64 at the center, and engages the first tooth portion 62. The first tooth portion 62 rotates in association with the rotation of the second tooth portion 65 and, consequently, the frame 54, the sub frame 55, the second switching rollers 52, and the auxiliary rollers 53 rotate integrally about the center axis 51*a*.

Figure 8:
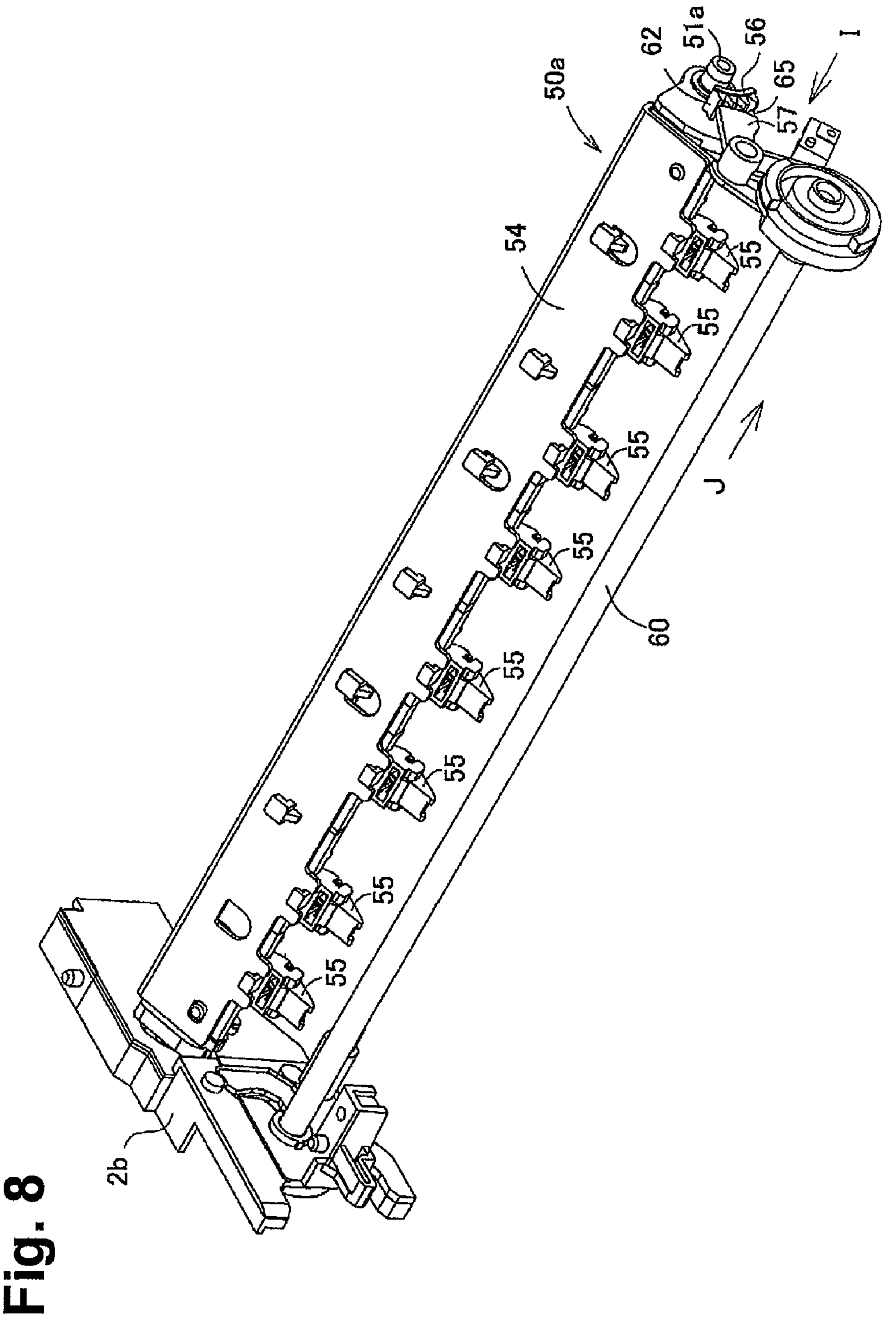
FIG. 8 is a perspective view of the drive mechanism of the conveying path switching mechanism of the image recording apparatus.
Figure 9:
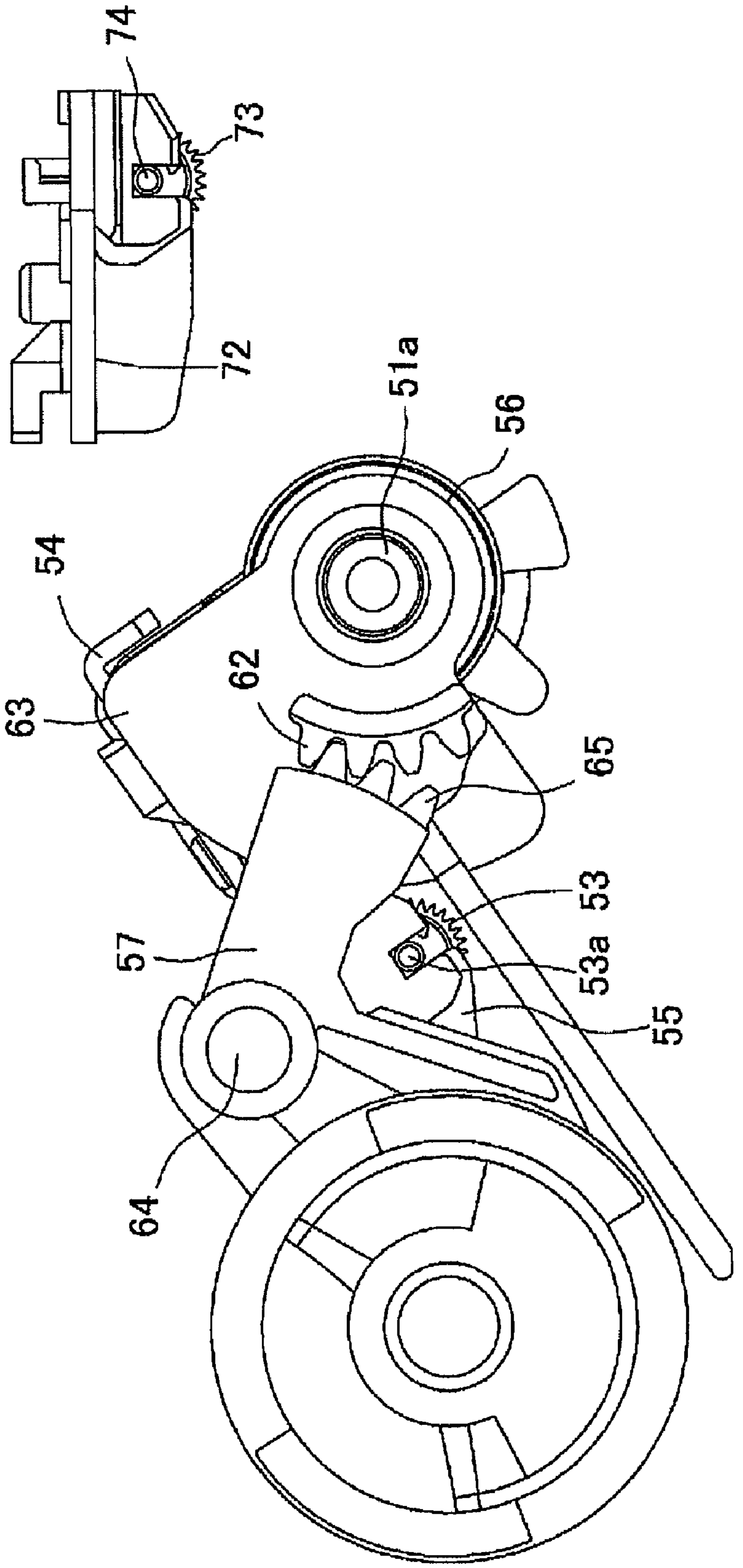
FIG. 9 is a drawing viewed in a direction indicated by an arrow I in FIG. 8.
Figure 10:
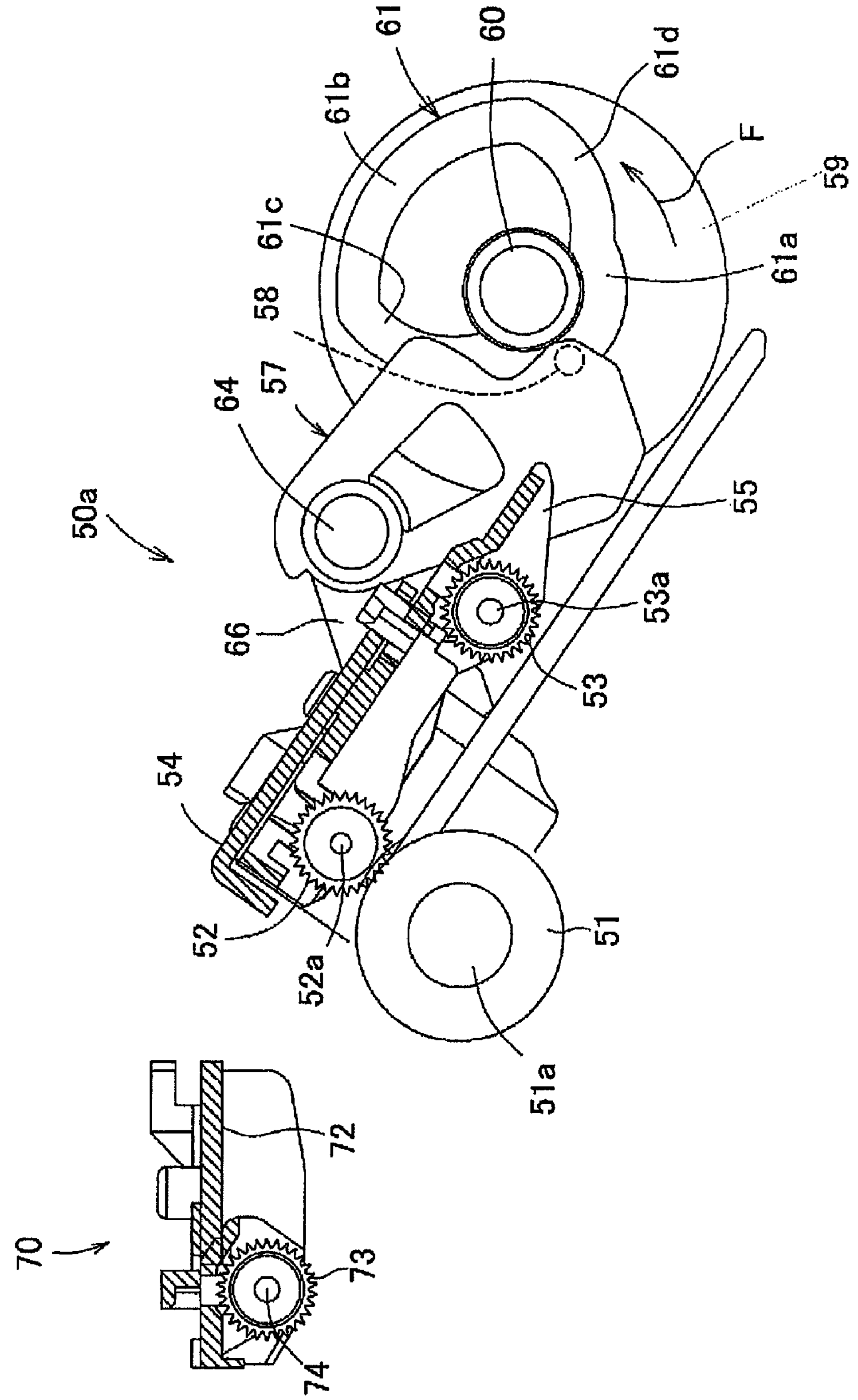
FIG. 10 is a drawing viewed in a direction indicated by an arrow J in FIG. 8.
Figure 11:
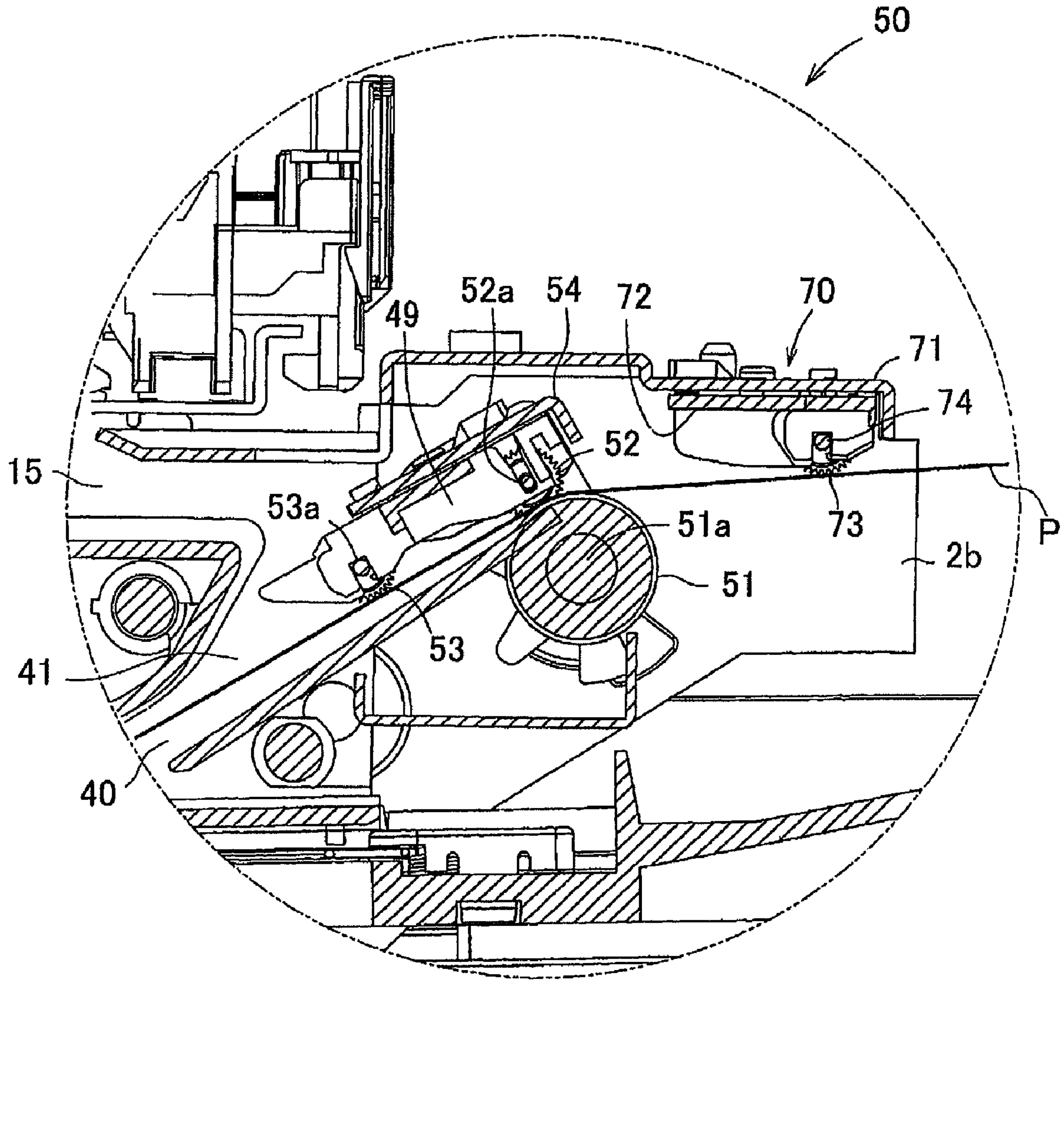
FIG. 11 is an enlarged view of a principal portion of the image recording apparatus shown in FIG. 2.

Referring next to FIGS. 8 to 11, the conveying path switching mechanism 50 in a state in which the frame 54, the sub frame 55, the second switching rollers 52, and the auxiliary rollers 53 rotate will be described. FIG. 8 is a perspective view of the drive mechanism 50*a* of the conveying path switching mechanism 50 in a state in which the frame 54, the sub frame 55, the second switching rollers 52, and the auxiliary rollers 53 rotate. FIGS. 9 and 10 are drawings viewed in the directions of arrows I and J in FIG. 8, respectively. FIG. 11 is an enlarged view of a principal portion of FIG. 2, and shows a state in which the conveying path switching mechanism 50 rotates about the center axis 51*a*.

As shown in FIG. 7, when the cam 59 rotates, the pin 58 is transferred relatively along the guide groove 61 and, specifically, when the pin slides along the connecting grooves 61*c* and 61*d*, the pin 58 moves in the radial direction of the cam 59. Therefore, when the cam 59 rotates clockwise (in the direction indicated by an arrow E) in FIG. 7, the pin 58 moves along the large arcuate portion 61*b*, the connecting groove 61*c*, and the small arcuate portion 61*a* in this sequence. Therefore, the drive gear 57 rotates clockwise in FIG. 5. Consequently, the driven gear 56 rotates counterclockwise about the center axis 51*a* in FIG. 6. Since the driven gear 56 is connected to the frame 54 as described above, the frame 54, the sub frame 55, the second switching rollers 52, and the auxiliary rollers 53 rotate integrally about the center axis 51*a* in association with the rotation of the driven gear 56, and a state shown in FIGS. 8 to 11 is assumed. The printing paper P nipped by the first switching roller 51 and the second switching rollers 52 in this state is fed onto the sheet feed tray 7 via the returning section 40 while being nipped between the first switching roller 51 and the second switching rollers 52 when the first switching roller 51 rotates in the reverse direction.

When the cam 59 rotates counterclockwise (in the direction indicated by an arrow F) in FIG. 10 from the state shown in FIGS. 8 to 11, the pin 58 moves along the small arcuate portion 61*a*, the connecting groove 61*c*, and the large arcuate portion 61*b* in this sequence. Therefore, the drive gear 57 rotates counterclockwise in FIG. 8. Consequently, the driven gear 56 rotates clockwise about the center axis 51*a* in FIG. 9.

At this time, the frame 54, the sub frame 55, the second switching rollers 52, and the auxiliary rollers 53 rotate about the center axis 51*a*. Therefore, as shown in FIGS. 4 and 11, the second switching rollers 52 rolls on the peripheral surface of the first switching roller 51. In the embodiment, the position of the conveying path switching mechanism 50 shown in FIG. 4 is defined as “first position”, and the position of the conveying path switching mechanism 50 shown in FIG. 11 is defined as “second position”. When the image is recorded on the printing paper P and the printing paper P is output, the conveying path switching mechanism 50 assumes the first position, so that a conveying path which allows the printing paper P to be conveyed along the conveying path 15 as is toward the sheet output tray 8 is formed. When the conveying path switching mechanism 50 changes the position to the second position, as shown in FIG. 11, a conveying path which allows the printing paper P to be fed toward the sheet feed tray 7 via the returning section 40 is formed.

Referring now to FIGS. 4 to 11, a configuration of the guide portion 70 will be described. As shown in FIGS. 4 and 11, the guide portion 70 is provided downstream from the first switching roller 51 and the second switching rollers 52. A supporting panel 71 is mounted on the main body frame 2*b*, and the guide portion 70 is provided on the supporting panel 71. The guide portion 70 is provided with a base portion 72 fixed to a lower surface of the supporting panel 71, and a guide roller 73 supported by the base portion 72. The base portion 72 is provided with a supporting shaft 74, and the guide roller 73 is rotatably supported by the supporting shaft 74. In the embodiment, the guide roller 73 is formed into a spur shape.

The guide portion 70 comes into contact with an upper surface of the printing paper P when the first switching roller 51 and the second switching rollers 52 rotate in the reverse direction and hence the printing paper P is fed to the returning section 40. The guide portion 70 does not come into contact with the printing paper P when the first switching roller 51 and the second switching rollers 52 rotate in the normal direction and hence the printing paper P is fed toward the sheet output tray. The guide portion 70 is provided at a position avoiding contact with an imaginary line connecting a contact point between the first switching roller 51 and the second switching rollers 52 in the first position, and a contact point between the sheet output roller 22*a* and the spur rollers 22*b*.

As described later, the printing paper P is changed in direction of conveyance, and is fed to the returning section 40. A portion of the printing paper P downstream from the first switching roller 51 and the second switching rollers 52 comes into abutment with an upper surface of the guide roller 73 and sags. Accordingly, the printing paper P is wound around the first switching roller 51 and the second switching rollers 52, and hence a stable conveying force is obtained, whereby the printing paper P is reliably fed to the returning section 40.

<Electric Configuration>

Subsequently, an electric configuration of the image recording apparatus 1 will be described with reference to FIG. 12. FIG. 12 is a block diagram showing a control portion 80 of the image recording apparatus 1.

The control portion 80 controls an entire operation of the image recording apparatus 1. The control portion 80 is made up of a main substrate and is arranged at a predetermined position in the main body frame 2*b*. A configuration relating to control of the scanner unit 6 is not a principal configuration of the invention, and detailed description will be omitted.

The control portion 80 is made up of a microcomputer mainly including a CPU 81, a ROM 82, a RAM 83, and an EEPROM 84. The control portion 80 is connected to an ASIC 86 via a bus 85.

The CPU 81 controls various functions of the image recording apparatus 1 and controls respective members connected to the ASIC 86 according to predetermined values or programs stored in the ROM 82 or the RAM 83, or respective signals sent and received via an NCU 87.

The ROM 82 stores programs or the like for controlling various operations performed by the image recording apparatus 1. For example, various control programs including a program for executing processes shown by flowcharts in FIGS. 13 to 15 or data required for executing such the control programs by the CPU 81 are stored therein.

The RAM 83 is used as a storage area where various data are stored temporarily when the CPU 81 executes the various programs, or as a work area. The image data to be recorded is stored in the RAM 83 temporarily and, when the recording is terminated, the image data is erased. The RAM 83 also stores data of feed pulse counter 83*a* and data of sheet size memory 83*b*.

The feed pulse counter 83*a* is a counter for counting the detected number of slits of the sheet feed encoder 16. The value of the feed pulse counter 83*a* is set to "0" when the leading edge of the printing paper P is sensed by the sheet sensor 28 and is incremented by "1" every time when a new slit of the sheet feed encoder 16 is detected in a recording process (FIG. 13) described later. Instead, the feed pulse counter 83*a* may be set to "0" when the rotation of the sheet feed roller 11 is started, and incremented by "1" when a new slit of the sheet feed encoder 16 is detected.

The sheet size memory 83*b* is configured to store a sheet size when the sheet size of the printing paper P for recording the image is specified by an external apparatus (not shown) or by an operation of the operation panel 4 by the user.

The EEPROM 84 stores settings and flags which are to be held after the power is turned OFF.

The NCU (Network Control Unit) 87 is connected to the ASIC 86. The NCU 87 is configured to receive an input of a communication signal from a public line. A MODEM 88 is configured to demodulate the input of the communication signal and then input the same to the ASIC 86. When the ASIC 86 sends the image data to the outside via facsimile transmission or the like, the MODEM 88 demodulates the image data into the communication signal, and outputs the same to the pubic line via the NCU 87.

The ASIC 86 generates mutually-exciting signal or the like to excite the sheet feed motor 14 according to a command from the CPU 81. A drive circuit 89 excites the sheet feed motor 14 according to the mutually-exciting signal and drives the sheet feed motor 14 to rotate. The drive circuit 89 rotates the sheet feed motor 14 in the normal direction or in the reverse direction by switching the exciting phase of the sheet feed motor 14. The rotating force of the sheet feed motor 14 is transmitted to the sheet feed roller 11.

The ASIC 86 generates mutually-exciting signal or the like to excite the conveying motor 23 according to a command from the CPU 81. A drive circuit 90 excites the conveying motor 23 according to the mutually-exciting signal and drives the conveying motor 23 to rotate. The drive circuit 90 rotates the conveying motor 23 in the normal direction or in the reverse direction by switching the exciting phase of the conveying motor 23. The rotating force of the conveying motor 23 is transmitted to the conveying roller 21*a*, the sheet output roller 22*a*, and the first switching roller 51. In this manner, in the image recording apparatus 1 according to the embodiment, the conveying motor 23 serves as a drive source for conveying the printing paper P located on the platen 31 or outputting the printing paper P after the recording onto the sheet output tray 8.

The ASIC 86 generates mutually-exciting signal or the like to excite an intermediate roller 27 according to a command from the CPU 81. A drive circuit 96 excites the intermediate roller 27 according to the mutually-exciting signal and drives the intermediate roller 27 to rotate. The drive circuit 96 rotates the intermediate roller 27 in the normal direction or in the reverse direction by switching the exciting phase of the intermediate roller 27. The rotating force of the intermediate roller 27 is transmitted to the intermediate roller 25*a*.

The ASIC 86 generates mutually-exciting signal or the like to excite the CR motor 34 according to a command from the CPU 81. A drive circuit 91 excites the CR motor 34 according to the mutually-exciting signal and drives the CR motor 34 to rotate. The drive circuit 91 rotates the CR motor 34 in the normal direction or in the reverse direction by switching the exciting phase of the CR motor 34. The rotating force of the CR motor 34 is transmitted to the carriage 33 via a required drive mechanism, whereby the carriage 33 is reciprocated.

The ASIC 86 generates excitation control signal or the like to excite the printhead 32 according to a command from the CPU 81. A drive circuit 92 excites the printhead 32 according to the excitation control signal and drives the printhead 32. The drive circuit 92 excites the printhead 32 and causes the printhead 32 to selectively output ink at predetermined timings.

A panel interface 93 having a keyboard 4*a* of the operation panel 4 for sending and receiving operations and the liquid crystal display (LCD) 5, a parallel interface 94 and a UBS interface 95 for sending and receiving data with respect to an external apparatus such as a personal computer via a parallel cable or a USB cable are connected to the ASIC 86. As described above, when the size of the printing paper P is specified by the operation panel 4 or a printer driver built in the external apparatus (for example, personal computer), the data is stored once in the sheet size memory 83*b*, and is used for calculating the position of the printing papers P2 and P3, described later in Step S21 described later.

The sheet sensor 28 configured to detect the position of the leading edge and the position of the trailing edge of the printing paper P, the sheet feed encoder 16 configured to detect the amount of rotation of the sheet feed roller 11, the rotary encoder 24 configured to detect the amount of rotation of the conveying roller 21*a*, the linear encoder 35 for detecting the amount of movement and the position of movement (current position) of the carriage 33 in the primary scanning direction and the like are connected to the ASIC 86.

<Operation in the Embodiment>

Subsequently, the operation of the image recording apparatus 1 according to the embodiment will be described with reference to FIGS. 13 to 19.

Figure 13:
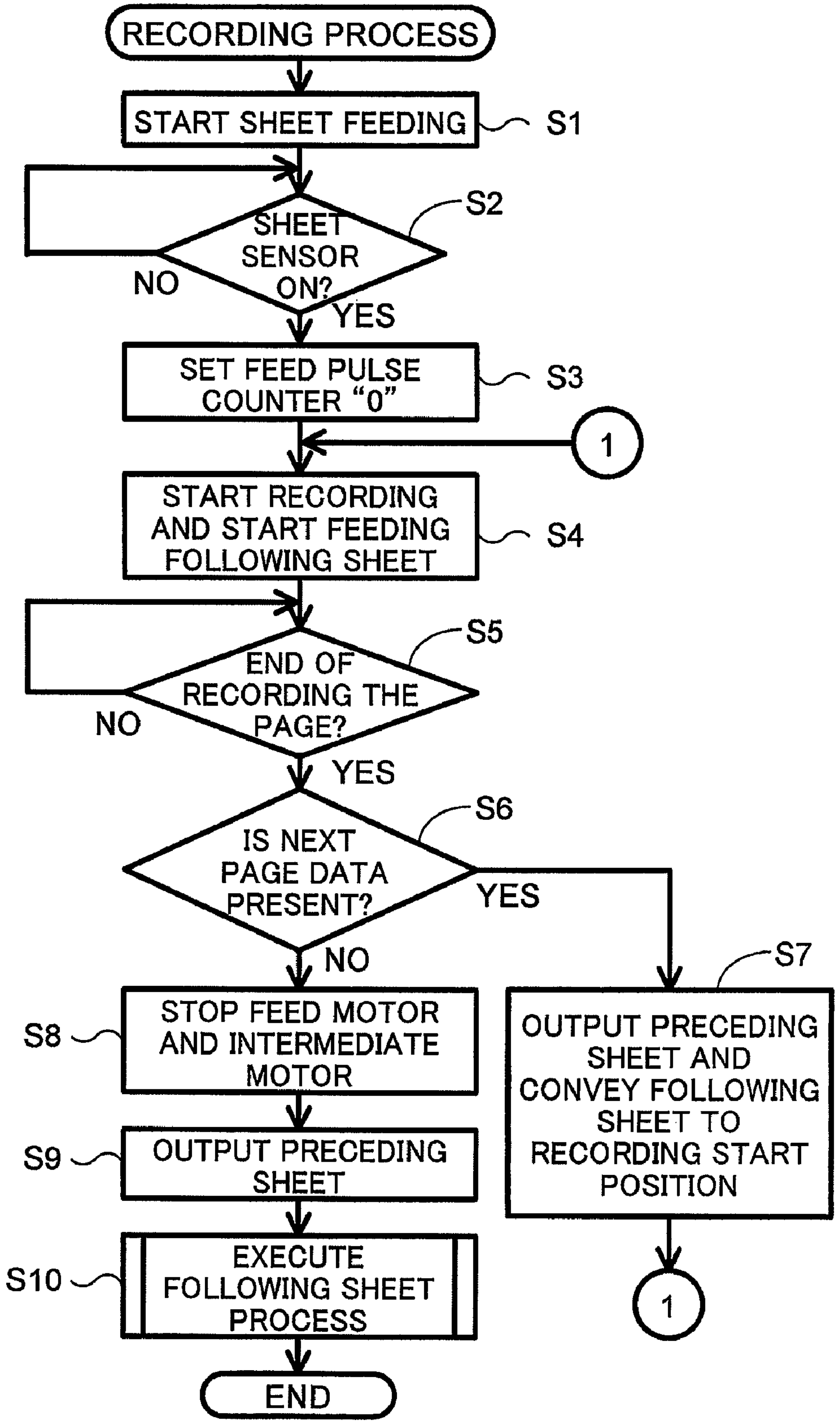
FIG. 13 is a flowchart showing a recording process of the image recording apparatus.

First of all, a recording process executed by the CPU 81 of the image recording apparatus 1 will be described with reference to FIG. 13. The recording process is a process to be activated when a command to start recording is issued from the external apparatus or the like, not shown. When the command to start recording is issued, the sheet size is also specified and is recorded in the sheet size memory 83*b* once. In the embodiment, the description is given assuming that the sheet size specified is A4 sheet with the longitudinal direction oriented in the lateral direction.

Figure 16A:
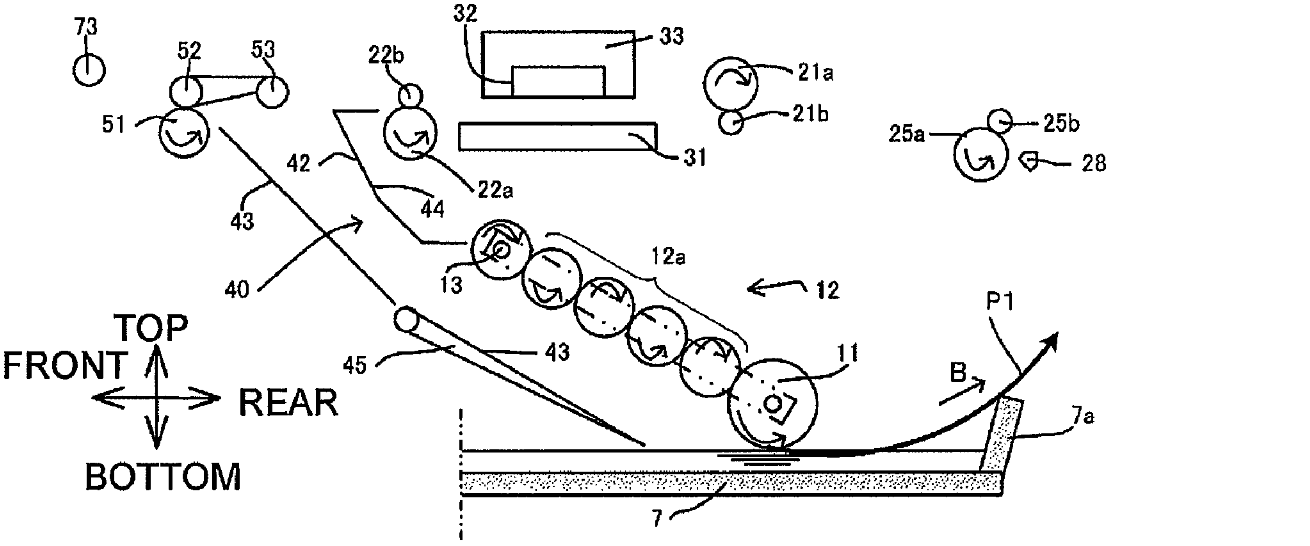
FIG. 16A is a drawing showing a travel of a printing paper in a recording process executed by the image recording apparatus.

Feeding of the printing paper P from the sheet feed tray 7 is started in step S1. In order to feed the printing paper P from the sheet feed tray 7, the sheet feed motor 14 is rotated in the normal direction in step S1 to rotate the sheet feed roller 11 in the normal direction (counterclockwise in FIG. 16). Therefore, as shown in FIG. 16A, only the topmost printing paper P1 (one sheet of printing paper P) is separated and is fed in the direction indicated by the arrow B. When starting the sheet feed in Step S1, the intermediate motor 27 and the conveying motor 23 are also rotated in the normal direction. Therefore, the intermediate roller 25*a*, the conveying roller 21*a*, the sheet output roller 22*a*, and the first switching roller 51 also rotate in the normal direction correspondingly.

Figure 16B:
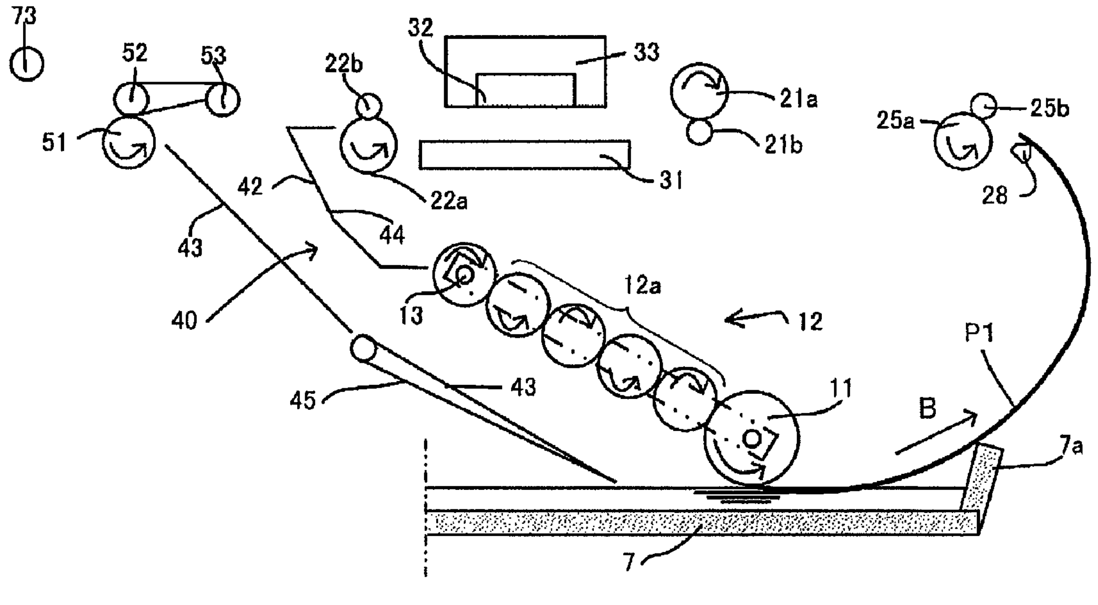
FIG. 16B is a drawing showing the travel of the printing paper in the recording process executed by the image recording apparatus.

Whether or not the sheet sensor 28 senses the leading edge of the printing paper P1 is determined (S2). This process is repeated until the leading edge of the printing paper P1 is sensed (S2:No) and, when it is determined that the leading edge of the printing paper P1 is sensed as shown in FIG. 16B (S2: Yes), the value of the feed pulse counter 83*a* is set to "0" (S3). From Step S3 onward, the value is incremented by "1" every time when a new slit of the sheet feed encoder 16 is detected, so that the amount of rotation of the sheet feed roller 11 after the sheet sensor 28 senses the leading edge of the printing paper P1 (S2) is computed on the basis of the value of the feed pulse counter 83*a*. From the amount of rotation of the sheet feed roller 11 and the sheet size of the printing paper P stored in the sheet size memory 83*b*, the position of the printing paper P1 fed to the sheet feed roller 11 and the positions of the printing papers P2 and P3 following the printing paper P1 are also computed.

It is also possible to reset the value of the feed pulse counter 83*a* to "0" again when the trailing edge of the printing paper P1 whose leading edge is sensed by the sheet sensor 28 has left the sheet sensor 28. In this configuration, when the sheet sensor 28 senses the leading edge of the following printing paper P2, the counting is started again. In this case, the printing paper P2 corresponds to the preceding printing paper, and the sheet sensor 28 computes the amount of rotation of the sheet feed roller 11 from a position where the sheet sensor 28 senses the leading edge of the printing paper P2, so that the position of the printing paper P2 and the position of the printing paper P3 following the printing paper P2 are computed.

Figure 16C:
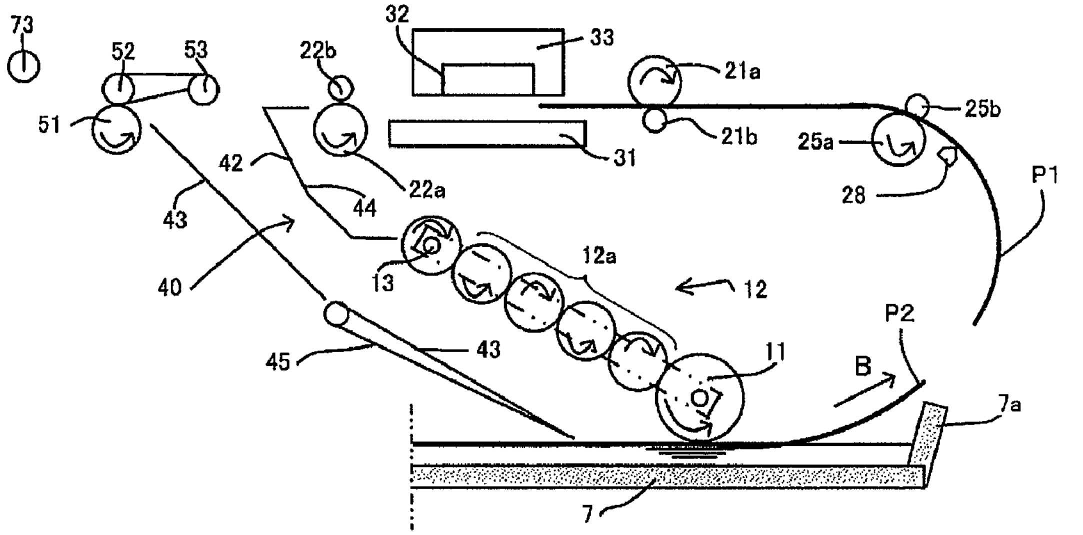
FIG. 16C is a drawing showing the travel of the printing paper in the recording process executed by the image recording apparatus.

When the printing paper P1 is conveyed by the intermediate roller 25*a*, and the leading edge of the printing paper P1 reaches the conveying roller 21*a*, the printing paper P1 is nipped by a nip portion between the conveying roller 21*a* and the nip roller 21*b* and is conveyed onto the platen 31 as shown in FIG. 16C, and the image recording on the printing paper P1 is performed (S4). After having started the recording, at a predetermined timing, the sheet feeding of the following printing paper P2 is started by the sheet feed roller 11 irrespective of whether or not the image data corresponding to the following printing paper P2 exists in the RAM 83 (S4).

Even when the single printing paper P is nipped by a nip portion between the intermediate roller 25*a* and the driven roller 25*b* and is also nipped at a position of the sheet feed roller 11, a nipping force at the nip portion between the intermediate roller 25*a* and the driven roller 25*b* is set to a value larger than the force of conveying the printing paper P on the sheet feed tray 7 by the sheet feed roller 11, and the peripheral velocity of the intermediate roller 25*a* is set to be larger than the peripheral velocity of the sheet feed roller 11, so that the printing paper P nipped at the nip portion between the intermediate roller 25*a* and the driven roller 25*b* is reliably conveyed by the conveying roller 21*a*.

Figure 16D:
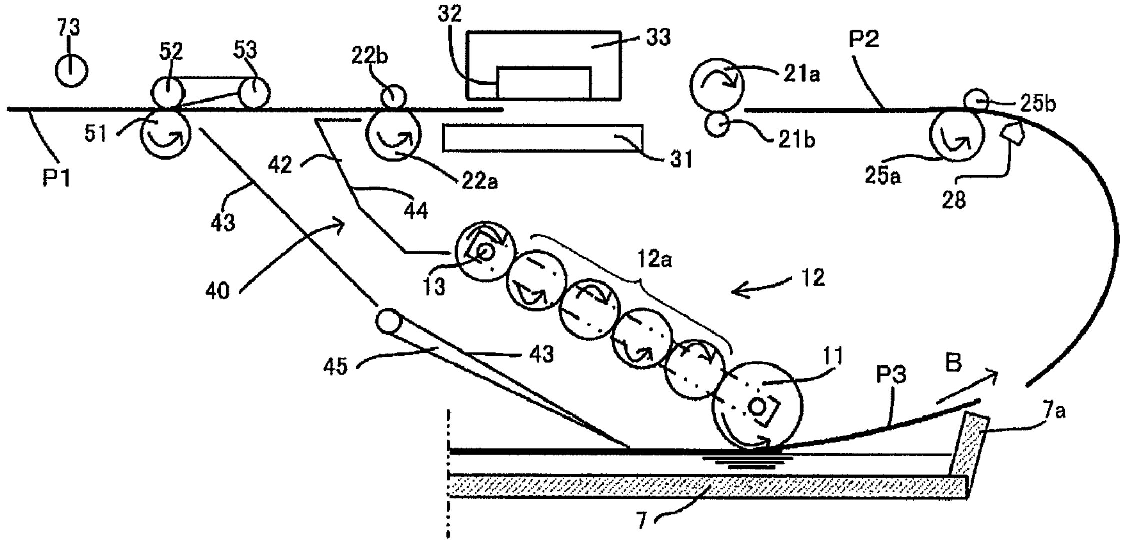
FIG. 16D is a drawing showing the travel of the printing paper in the recording process executed by the image recording apparatus.
Figure 16E:
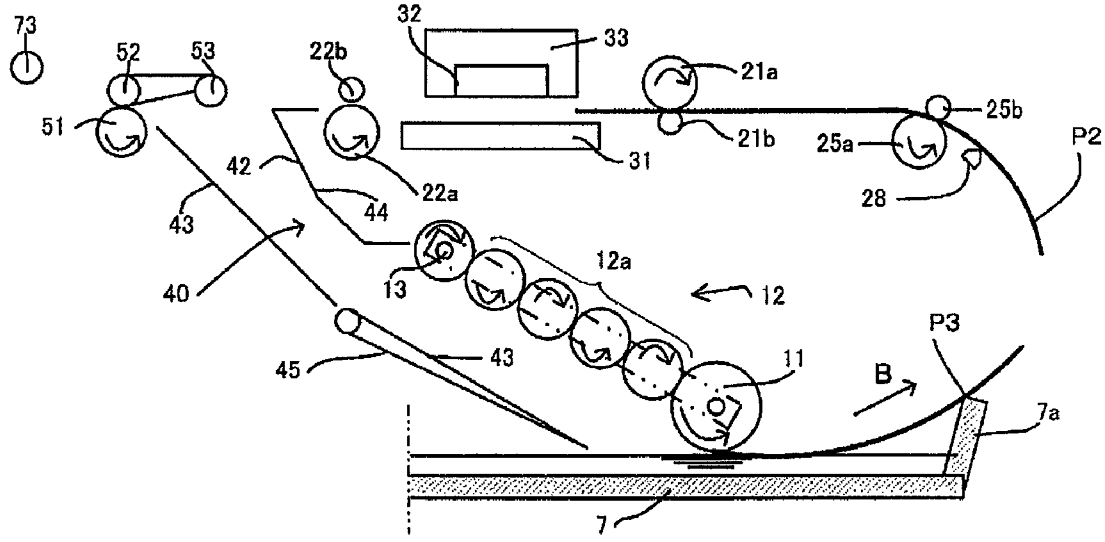
FIG. 16E is a drawing showing the travel of the printing paper in the recording process executed by the image recording apparatus.

Subsequently, whether or not the image recording of the preceding printing paper P1 is terminated is determined (S5). After having repeated the process until the image recording on the preceding printing paper P1 is terminated (S5: No), when it is determined that the image recording on the preceding printing paper P1 is terminated (S5: YES), an attempt is made to receive the image data for the next page (following printing paper P2), and whether or not the image data is stored in the RAM 83 is determined (S6). When it is determined that the image data is stored in the RAM 83 (S6: YES) by making an attempt to receive the image data for the next page (following printing paper P2), the conveying motor 23 is rotated continuously in the normal direction to rotate the conveying roller 21*a*, the sheet output roller 22*a* and the first switching roller 51 in the normal direction as shown in FIG. 16D. At this time, since the sheet feed motor 14 and the intermediate motor 27 rotate in the normal direction, the sheet feed roller 11 and the intermediate roller 25*a* also rotates in the normal direction. Accordingly, as shown in FIG. 16E, the preceding printing paper P1 (previous page) is output and a next page (following printing paper P2) is conveyed to a position to start recording (S7). In order to start the image recording on the next page (following printing paper P2), the procedure goes back to Step S4. In this manner, a plurality of printing papers P are fed and conveyed continuously to achieve a high-speed recording operation.

Figure 16F:
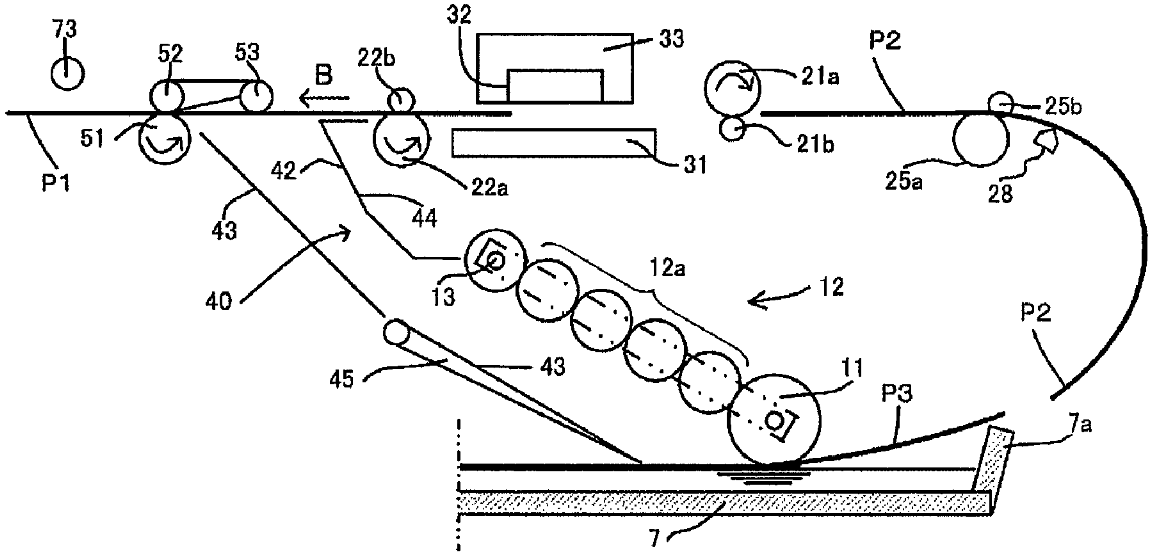
FIG. 16F is a drawing showing the travel of the printing paper in the recording process executed by the image recording apparatus.

In contrast, when the image data for the next page is not received and hence it is determined that the image data is not stored in the RAM 83 (S6: No) in Step S6, as shown in FIG. 16F, the sheet feed motor 14 and the intermediate motor 27 are stopped to stop the sheet feed roller 11 and the intermediate roller 25*a* (S8). The conveying motor 23 is rotated in the normal direction continuously to rotate the conveying roller 21*a*, the sheet output roller 22*a*, and the first switching roller 51 in the normal direction. Accordingly, the preceding printing paper P1 (previous page) after the image recording is output (S9).

Figure 14:
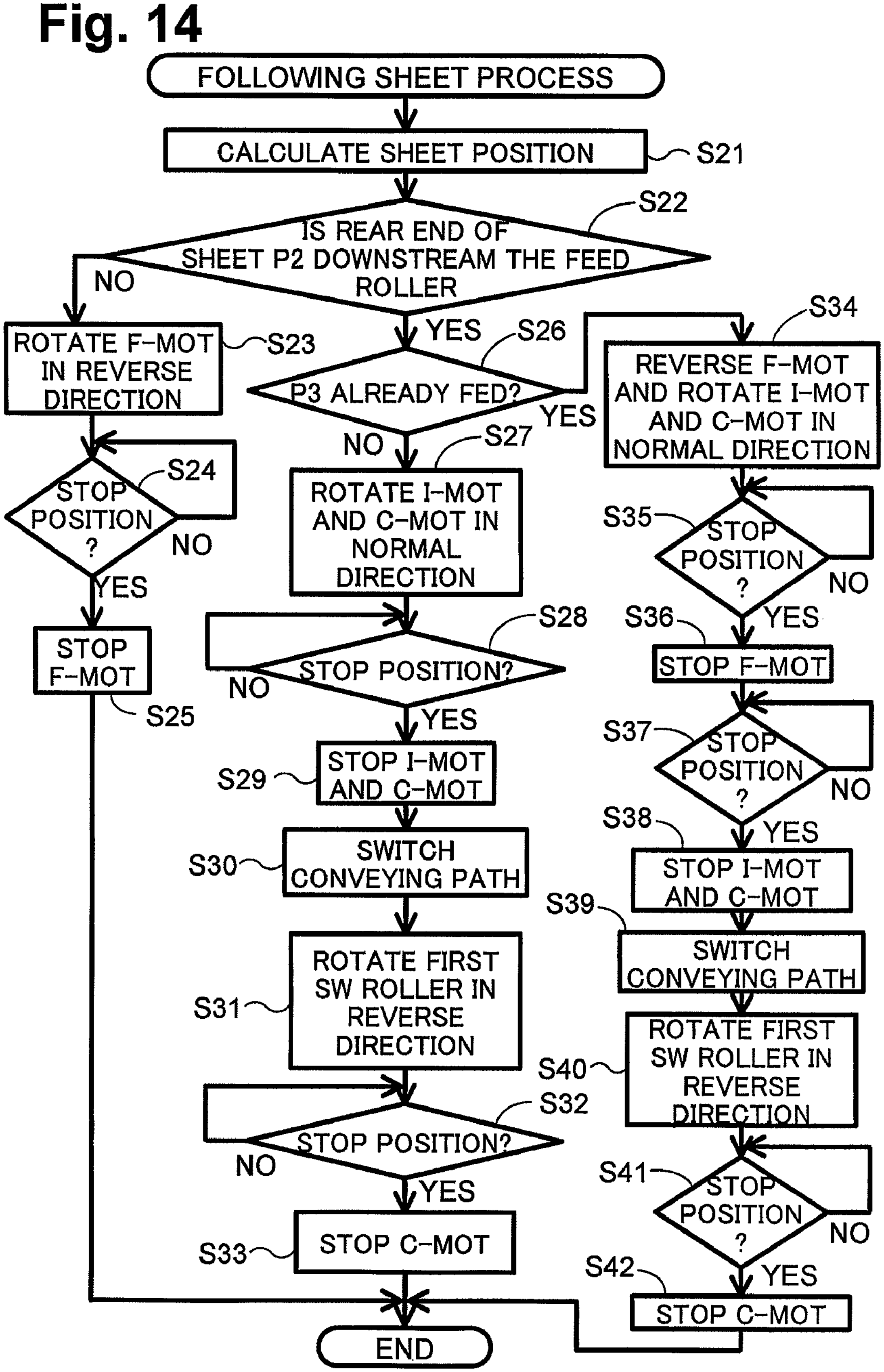
FIG. 14 is a flowchart showing a next printing paper process of the image recording apparatus.

Subsequently, a next printing paper process shown in FIG. 14 is executed (S 10). Detailed description about the next printing paper process will be described later. By the next printing paper process, the following printing papers P2 and P3 remaining in the conveying path 15 are reliably returned to the sheet feed tray 7. Then the recording process is ended.

Referring now to FIG. 14, the next printing paper process of the image recording apparatus 1 will be described in detail. Assuming that the sheet size of the printing paper P is A4, horizontal as an example, the length in the direction of conveyance is "21 cm". As an example of the sizes of the respective portions of the image recording apparatus 1, the description will be given on the assumption that the length of the conveying path 15 from the sheet feed roller 11 to the sheet sensor 28 is "15 cm", the length of the conveying path 15 from the sheet feed roller 11 to the intermediate roller 25*a* is "16 cm", and the length of the conveying path 15 from the sheet feed roller 11 to the conveying roller 21*a* is "30 cm".

In the next printing paper process, the positions of the following printing papers P2 and P3 are calculated from the amount of rotation of the sheet feed roller 11 from a position where the leading edge of the printing paper P1 is sensed by the sheet sensor 28, that is, the value of the feed pulse counter 83*a* and the sheet size of the printing paper P stored in the sheet size memory 83*b* (S21). From the result of the calculation in Step S21, whether or not the trailing edge of the following printing paper P2 is positioned downstream from the sheet feed roller 11 is determined (S22).

Here, a case where the trailing edge of the following printing paper P2 is not located downstream from the sheet feed roller 11 (S22: No) will be described. For example, the case where the amount of rotation of the sheet feed roller 11 calculated in Step S21 is "24 cm" is exemplified. In this case, since the length of the printing paper P1 is "21 cm", and the length from the sheet feed roller 11 to the sheet sensor 28 is "15 cm", when the printing paper P1 is fed by "6 cm" from the position where the leading edge of the printing paper P1 has passed the sheet sensor 28, the trailing edge leaves the sheet feed roller 11, and the printing paper P2 is fed. Then, the printing paper P2 is stopped when the printing paper P2 is fed by "18 cm". Since the length of the printing paper P2 is "21 cm", it is understood that the trailing edge of the printing paper P2 is located upstream from the sheet feed roller 11 by "3 cm".

Therefore, when it is determined that the trailing edge of the following printing paper P2 is not located downstream from the sheet feed roller 11 (S22: No), the sheet feed motor 14 is rotated in the reverse direction as shown in FIG. 17A to rotate the sheet feed roller 11 in the reverse direction in order to return the printing paper P2 to the sheet feed tray 7 (S23).

The amount of reverse rotation of the sheet feed roller 11 required for returning the printing paper P2 to the sheet feed tray 7 is calculated from the position of the printing paper P2, and whether or not the sheet feed roller 11 has rotated by the amount of reverse rotation is determined (S24). At this time, as shown in FIG. 17B, the printing paper P2 is conveyed in the direction indicated by an arrow C. The "amount of reverse rotation" here means the amount of rotation of the sheet feed roller 11 required when feeding the printing paper P2. In other words, in the example given above, since the printing paper P2 is stopped at a position fed by "18 cm" from the sheet feed roller 11, the amount of reverse rotation corresponds to an amount of rotation of "18 cm". When the sheet feed roller 11 is rotated in the reverse direction until the sheet feed roller 11 rotates by the amount of reverse rotation (S24: No), and the sheet feed roller 11 is rotated by the amount of reverse rotation (S24: Yes), as shown in FIG. 17C, the sheet feed motor 14 is stopped to stop the sheet feed roller 11 (S25), whereby the next printing paper process is ended. In this configuration, the following printing paper P2 remaining in the conveying path 15 is returned to the stacked position on the sheet feed tray 7. Accordingly, a blank following printing paper P2 delivered to the conveying path 15 is rendered reusable in the image recording.

When it is determined that the trailing edge of the following printing paper P2 is located downstream from the sheet feed roller 11 in Step S22 (S22: Yes), whether or not the printing paper P3 following after the following printing paper P2 is fed by the sheet feed roller 11 is determined (S26).

Here, a case where the trailing edge of the following printing paper P2 is located downstream from the sheet feed roller 11 (S22: Yes), and the printing paper P3 following after the following printing paper P2 is not fed by the sheet feed roller 11 (S26: No) will be described. For example, the case where the amount of rotation of the sheet feed roller 11 calculated in Step S21 is "27 cm" is exemplified. In this case, since the length of the printing paper P1 is "21 cm", and the length from the sheet feed roller 11 to the sheet sensor 28 is "15 cm", when the printing paper P1 is fed by "6 cm" from the position where the leading edge of the printing paper P1 has passed the sheet sensor 28, the trailing edge leaves the sheet feed roller 11, and the printing paper P2 is fed. Then, the printing paper P2 is stopped when the printing paper P2 is fed by "21 cm". Since the length of the printing paper P2 is "21 cm", the trailing edge of the printing paper P2 is detected when it is positioned at a press-contact position of the sheet feed roller 11. However, in the embodiment, when the trailing edge of the printing paper P2 is located at the press-contact position of the sheet feed roller 11, the trailing edge thereof is determined to be downstream. It is because that the amount of the trailing edge of the printing paper P2 being in press contact with the sheet feed roller is a slight amount, there may arise a case where the printing paper P2 cannot be returned to the sheet feed tray 7 by the reverse rotation of the sheet feed roller 11. At this time, it is understood that the printing paper P3 following the printing paper P2 is not fed by the sheet feed roller 11.

Figure 18A:
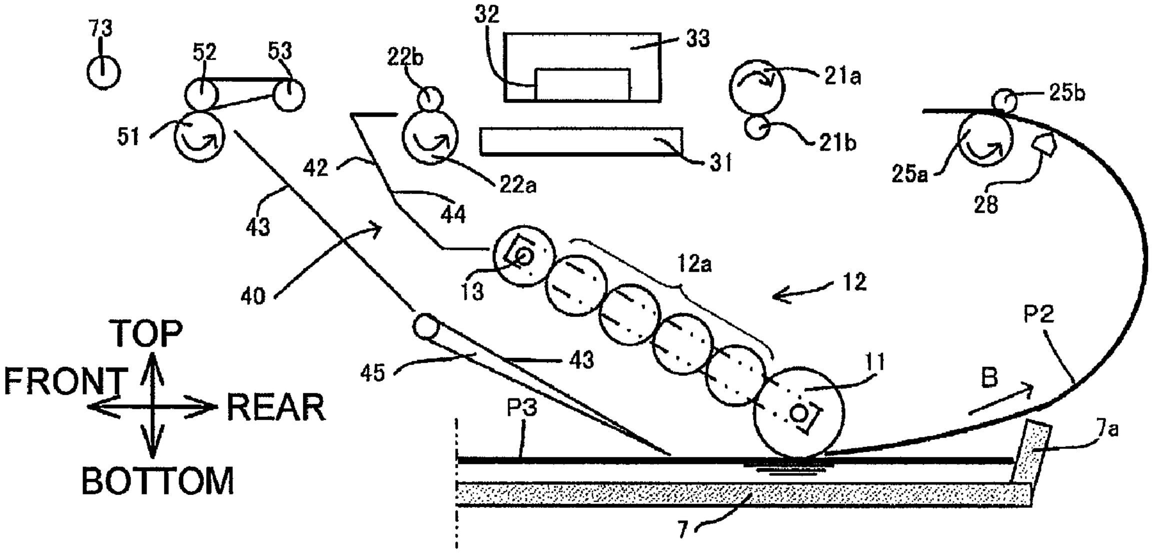
FIG. 18A is a drawing showing the travel of the printing paper in a next printing paper process executed by the image recording apparatus.

Therefore, when it is determined that the printing paper P3 is not fed by the sheet feed roller 11 (S26: No), only the printing paper P2 remains in the conveying path 15. In addition, since the printing paper P2 is not in press contact with the sheet feed roller 11, it cannot be returned to the sheet feed tray 7 by the sheet feed roller 11. Therefore, as shown in FIG. 18A, the intermediate motor 27 and the conveying motor 23 are rotated in the normal direction to rotate the intermediate roller 25*a*, the conveying roller 21*a*, the sheet output roller 22*a*, and the first switching roller 51 in the normal direction (S27). Here, the term "normal rotation" means the counterclockwise rotation in FIG. 18A for the intermediate roller 25*a*, the sheet output roller 22*a*, and the first switching roller 51, and the clockwise rotation in FIG. 18A for the conveying roller 21*a*.

Figure 18B:
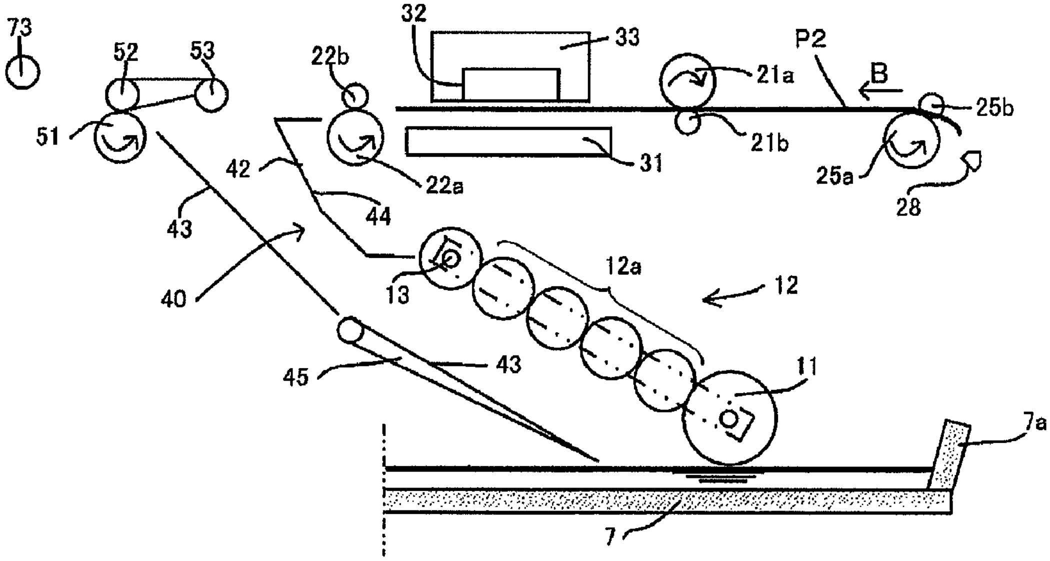
FIG. 18B is a drawing showing the travel of the printing paper in the next printing paper process executed by the image recording apparatus.
Figure 18C:
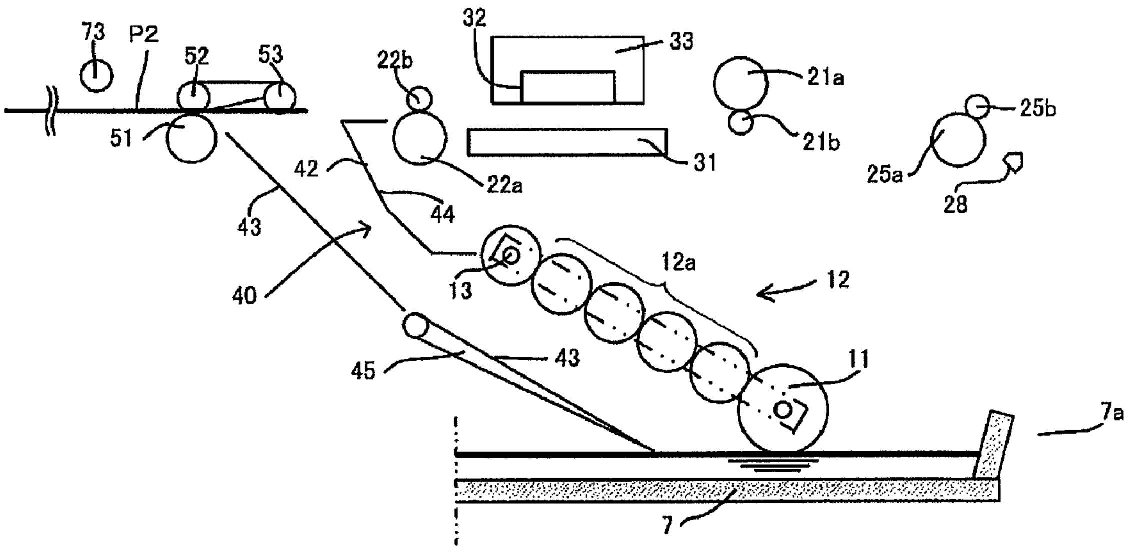
FIG. 18C is a drawing showing the travel of the printing paper in the next printing paper process executed by the image recording apparatus.

It is determined whether the intermediate roller 25*a*, the conveying roller 21*a*, the sheet output roller 22*a*, and the first switching roller 51 are rotated in the normal rotation by a predetermined amount from a position where the trailing edge of the printing paper P2 has passed the sheet sensor 28 (S28). The term "predetermined amount" here means the amount of rotation required for the trailing edge of the printing paper P2 reaching the auxiliary rollers 53. At this time, as shown in FIG. 18B, the printing paper P2 is conveyed in the direction indicated by the arrow B. The intermediate roller 25*a*, the conveying roller 21*a*, the sheet output roller 22*a*, and the first switching roller 51 are rotated in the normal direction until the intermediate roller 25*a*, the conveying roller 21*a*, the sheet output roller 22*a*, and the first switching roller 51 rotate by the predetermined amount (S28: No) and, when the intermediate roller 25*a*, the conveying roller 21*a*, the sheet output roller 22*a*, and the first switching roller 51 rotate by the predetermined amount (S28: Yes), as shown in FIG. 18C, the trailing edge of the printing paper P2 reaches the auxiliary rollers 53, so that the intermediate motor 27 and the conveying motor 23 are stopped to stop the intermediate roller 25*a*, the conveying roller 21*a*, the sheet output roller 22*a*, and the first switching roller 51 (S29).

The position of the trailing edge of the printing paper P2 is grasped by the control portion 80 from an output value from the rotary encoder 24 with reference to a time point when the ON/OFF of the sheet sensor 28 is switched by the passage of the trailing edge of the printing paper P2.

Figure 18D:
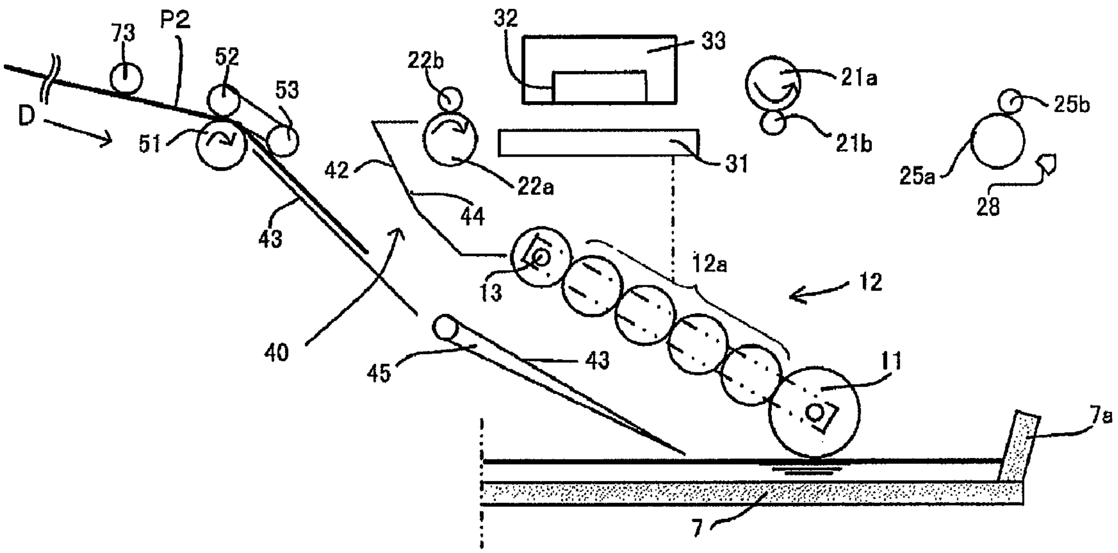
FIG. 18D is a drawing showing the travel of the printing paper in the next printing paper process executed by the image recording apparatus.
Figure 18E:
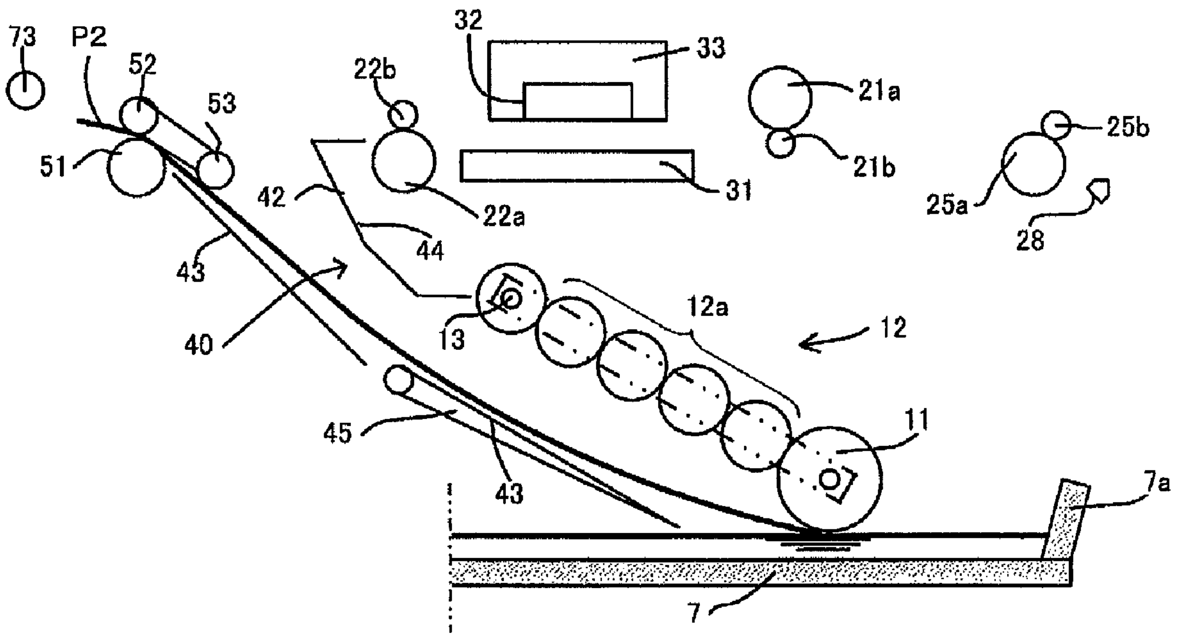
FIG. 18E is a drawing showing the travel of the printing paper in the next printing paper process executed by the image recording apparatus.

Subsequently, as shown in FIG. 18D, the conveying motor 23 is rotated in the reverse direction to change the position of the conveying path switching mechanism 50 from the first position to the second position (S30) and rotate the first switching roller 51 in the reverse direction (clockwise in FIG. 18D) (S31). Accordingly, the trailing edge of the printing paper P2 is pressed by the auxiliary rollers 53 and is directed toward the returning section 40. The printing paper P2 is conveyed in the direction indicated by an arrow D to the returning section 40. It is determined whether the first switching roller 51 is rotated in the reverse direction by the predetermined amount (S32). The "predetermined amount" here means the amount of rotation stored in the ROM 82 and required for the trailing edge of the printing paper P2 to reach the press-contact position of the sheet feed roller 11 on the sheet feed tray 7. When the first switching roller 51 is rotated in the reverse direction until the first switching roller 51 rotates by the predetermined amount (S32: No), and the first switching roller 51 rotates in the reverse direction by the predetermined amount (S32: Yes), as shown in FIG. 18E, the trailing edge of the printing paper P2 reaches the sheet feed roller 11, so that the conveying motor 23 is stopped to stop the first switching roller 51 (S33). In this configuration, the following printing paper P2 remaining in the conveying path 15 is returned to the press-contact position of the sheet feed roller 11 on the sheet feed tray 7. Therefore, it is not necessary to output the blank following printing paper P2, which is not in press-contact at the trailing edge thereof with the sheet feed roller 11 to the sheet output tray 8, so that the printing paper P2 is returned onto the sheet feed tray 7 for rendering the same reusable for the image recording.

Here, a case where the trailing edge of the following printing paper P2 is located downstream from the sheet feed roller 11 (S22: Yes), and the printing paper P3 following after the following printing paper P2 is fed by the sheet feed roller 11 (S26: Yes) will be described. For example, the case where the amount of rotation of the sheet feed roller 11 calculated in Step S21 is "30 cm" is exemplified. In this case, since the length of the printing paper P1 is "21 cm", and the length from the sheet feed roller 11 to the sheet sensor 28 is "15 cm", when the printing paper P1 is fed by "6 cm" from the position where the leading edge of the printing paper P1 has passed the sheet sensor 28, the trailing edge leaves the sheet feed roller 11, and the printing paper P2 is fed. When the printing paper P2 is fed by the "21 cm", the trailing edge leaves from the sheet feed roller 11, and the printing paper P3 is fed. Then, the printing paper P3 is stopped when the printing paper P3 is fed by "3 cm". The length of the printing paper P2 is "21 cm", and the printing paper P2 is conveyed downstream by the intermediate roller 25*a* by an amount of rotation of "3 cm" of the sheet feed roller 11 from the position where the trailing edge has left the sheet feed roller 11. Since the length from the sheet feed roller 11 to the conveying roller 21*a* is "30 cm", the leading edge of the printing paper P2 is located at a position not reaching the conveying roller 21*a*. It is understood that the leading edge of the printing paper P3 is located downstream from the sheet feed roller 11 by "3 cm".

Figure 19A:
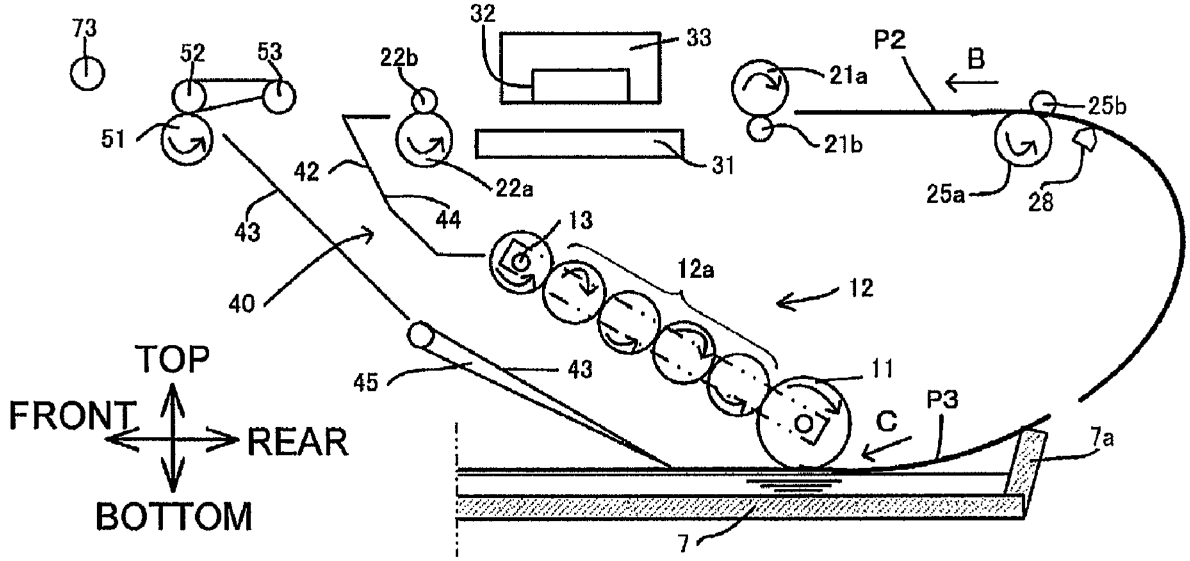
FIG. 19A is a drawing showing the travel of the printing paper in the next printing paper process executed by the image recording apparatus.

Therefore, in Step S26, when it is determined that the printing paper P3 is fed by the sheet feed roller 11 (S26: Yes), the printing papers P2 and P3 remain in the conveying path 15. At this time, since the printing paper P2 is not in press contact with the sheet feed roller 11, it cannot be returned to the sheet feed tray 7 by the sheet feed roller 11. Since the printing paper P3 is in press contact with the sheet feed roller 11, it can be returned to the sheet feed tray 7 by the sheet feed roller 11. Therefore, as shown in FIG. 19A, the sheet feed motor 14 is rotated in the reverse direction and the intermediate motor 27 and the conveying motor 23 are rotated in the normal direction to rotate the sheet feed roller 11 in the reverse direction, and rotate the intermediate roller 25*a*, the conveying roller 21*a*, the sheet output roller 22*a*, and the first switching roller 51 in the normal direction (S34). Here, the rotation in the normal direction and the rotation in the reverse direction are the same as the directions describe above. Accordingly, the printing paper P2 is conveyed in the direction indicated by the arrow B, and the printing paper P3 is conveyed in the direction indicated by the arrow C.

Figure 19B:
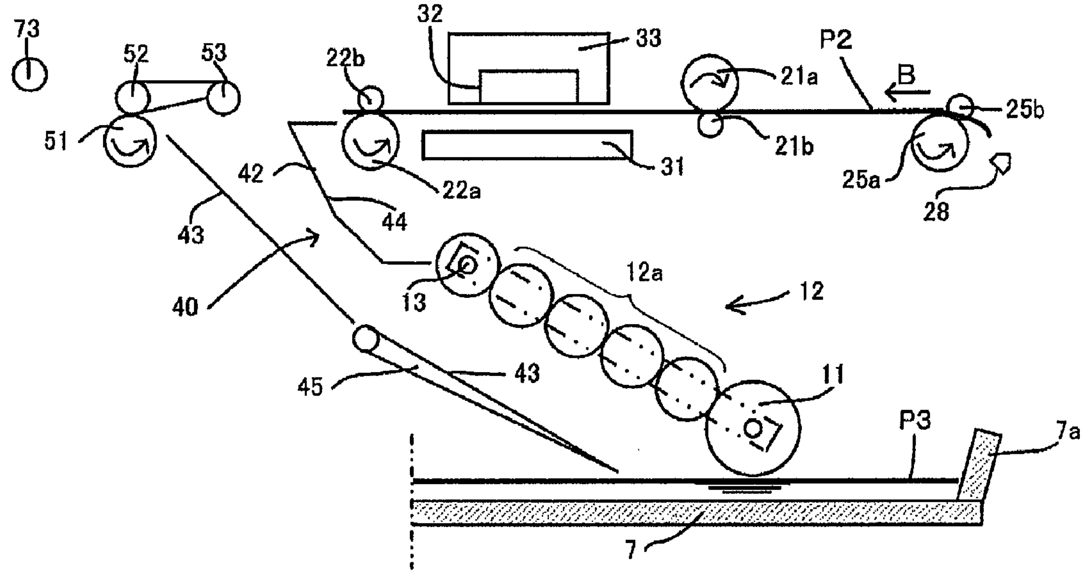
FIG. 19B is a drawing showing the travel of the printing paper in the next printing paper process executed by the image recording apparatus.

From the printing papers P2 and P3 remaining in the conveying path 15, since the length of the printing paper P3 returned to the sheet feed tray 7 by the sheet feed roller 11 exposed in the conveying path 15 is shorter than the same of the printing paper P2 returned back to the sheet feed tray 7 by the conveying path switching mechanism 50, the printing paper P3 returns to the sheet feed tray 7 ahead. Therefore, first of all, the amount of reverse rotation of the sheet feed roller 11 required for returning the printing paper P3 to the sheet feed tray 7 is calculated from the result of calculation in step S21, and whether or not the sheet feed roller 11 has rotated by the amount of reverse rotation is determined (S35). The "amount of reverse rotation" here means the amount of rotation of the sheet feed roller 11 required when feeding the printing paper P3. In other words, in the example given above, since the printing paper P2 is stopped at a position fed by "3 cm" from the sheet feed roller 11, the amount of reverse rotation corresponds to an amount of rotation of "3 cm". When the sheet feed roller 11 is rotated in the reverse direction until the sheet feed roller 11 rotates by the amount of reverse rotation (S35: No), and the sheet feed roller 11 is rotated by the amount of reverse rotation (S35: Yes), as shown in FIG. 19B, the sheet feed motor 14 is stopped to stop the sheet feed roller 11 (S36). In this configuration, the printing paper P3 remaining in the conveying path 15 is returned to the stacked position on the sheet feed tray 7. Accordingly, a blank following printing paper P3 delivered to the conveying path 15 is rendered reusable in the image recording.

Figure 19C:
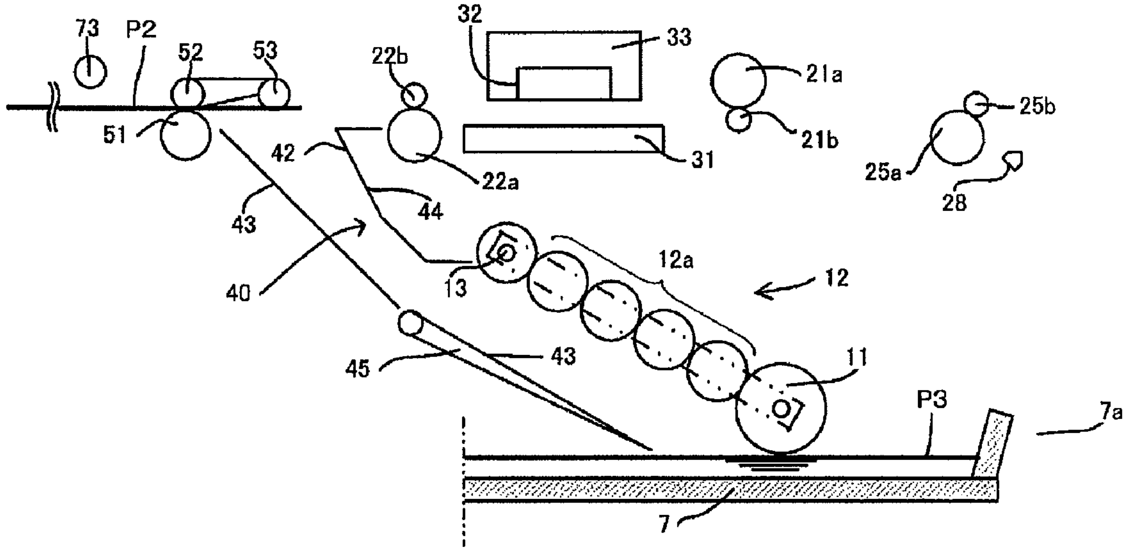
FIG. 19C is a drawing showing the travel of the printing paper in the next printing paper process executed by the image recording apparatus.

Subsequently, it is determined that the intermediate roller 25*a*, the conveying roller 21*a*, the sheet output roller 22*a*, and the first switching roller 51 are rotated in the normal rotation by a predetermined amount from a position where the trailing edge of the printing paper P2 has passed the sheet sensor 28 (S37). The term "predetermined amount" here means the amount of rotation required for the trailing edge of the printing paper P2 reaching the auxiliary rollers 53. At this time, as shown in FIG. 19B, the printing paper P2 is conveyed in the direction indicated by the arrow B. The intermediate roller 25*a*, the conveying roller 21*a*, the sheet output roller 22*a*, and the first switching roller 51 are rotated in the normal direction until the intermediate roller 25*a*, the conveying roller 21*a*, the sheet output roller 22*a*, and the first switching roller 51 rotate by the predetermined amount (S37: No) and, when the intermediate roller 25*a*, the conveying roller 21*a*, the sheet output roller 22*a*, and the first switching roller 51 rotate by the predetermined amount (S37: Yes), as shown in FIG. 19C, the trailing edge of the printing paper P2 reaches the auxiliary rollers 53, so that the intermediate motor 27 and the conveying motor 23 are stopped to stop the intermediate roller 25*a*, the conveying roller 21*a*, the sheet output roller 22*a*, and the first switching roller 51 (S38).

As described above, the position of the trailing edge of the printing paper P2 is grasped by the control portion 80 from the output value from the rotary encoder 24 with reference to the time point when the ON/OFF of the sheet sensor 28 is switched.

Figure 19D:
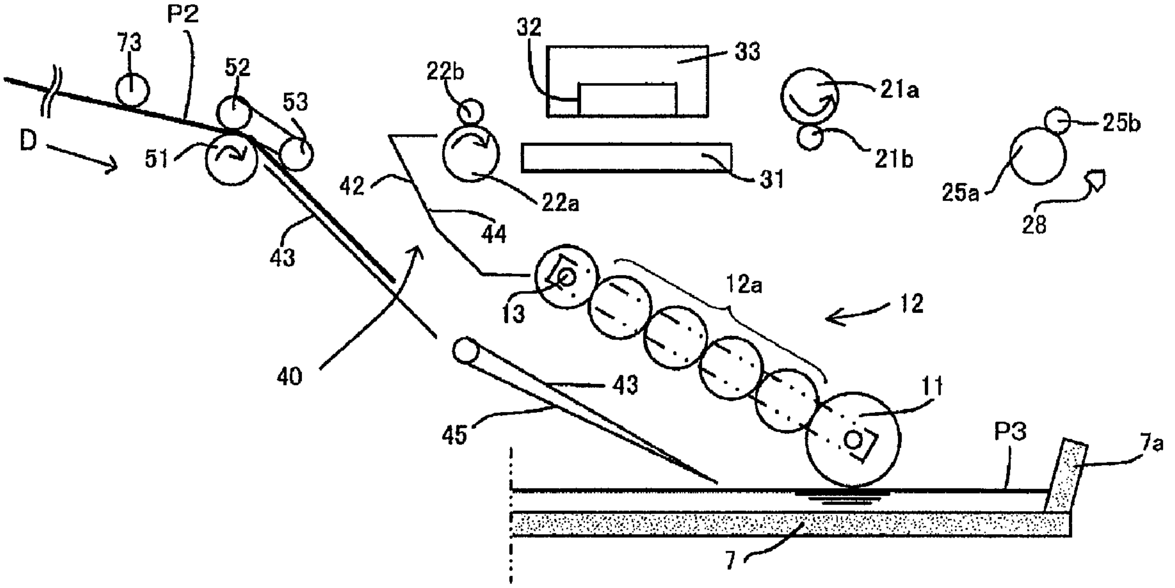
FIG. 19D is a drawing showing the travel of the printing paper in the next printing paper process executed by the image recording apparatus.
Figure 19E:
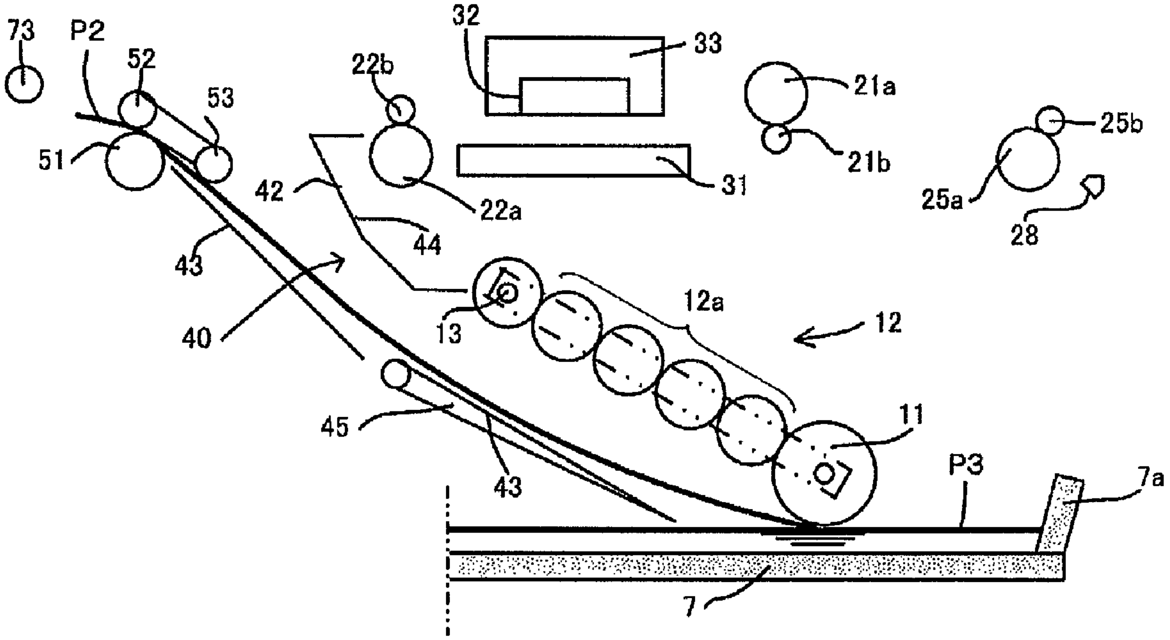
FIG. 19E is a drawing showing the travel of the printing paper in the next printing paper process executed by the image recording apparatus.

Subsequently, as shown in FIG. 19D, the conveying motor 23 is rotated in the reverse direction to change the position of the conveying path switching mechanism 50 from the first position to the second position (S39) and rotate the first switching roller 51 in the reverse direction (clockwise in FIG. 19D) (S40). Accordingly, the trailing edge of the printing paper P2 is pressed by the auxiliary rollers 53 and is directed toward the returning section 40. The printing paper P2 is conveyed in the direction indicated by the arrow D to the returning section 40. Whether the first switching roller 51 is rotated in the reverse direction by the predetermined amount is determined (S41). The predetermined amount here means the amount of rotation stored in the ROM 82 and required for the trailing edge of the printing paper P2 to reach the press-contact position of the sheet feed roller 11. When the first switching roller 51 is rotated in the reverse direction until the first switching roller 51 rotates by the predetermined amount (S41: No), and the first switching roller 51 rotates in the reverse direction by the predetermined amount (S41: Yes), as shown in FIG. 19E, the trailing edge of the printing paper P2 reaches the sheet feed roller 11, so that the conveying motor 23 is stopped to stop the first switching roller 51 (S42). In this configuration, the following printing paper P2 remaining in the conveying path 15 is returned to the press-contact position of the sheet feed roller 11 on the sheet feed tray 7. Therefore, it is not necessary to output the blank following printing paper P2, which is not in press-contact at the trailing edge thereof with the sheet feed roller 11 to the sheet output tray 8, so that the printing paper P2 is returned onto the sheet feed tray 7 for rendering the same reusable for the image recording.

Since the printing paper P2 is returned to the sheet feed tray 7 later than the printing paper P3, the printing paper P2 is placed on the printing paper P3, so that the printing paper P2 is fed ahead by the sheet feed roller 11 when it is reused.

In a case where the re-feeding of the sheet is started, when the printing paper P2 leaves the nip position between the first switching roller and the second switching roller, the conveying motor 27 is rotated in the normal direction for conveying the re-fed printing paper P2 by the sheet feed roller 11, so that the conveying path switching mechanism 50 is returned from the second position to the first position.

Figure 15:
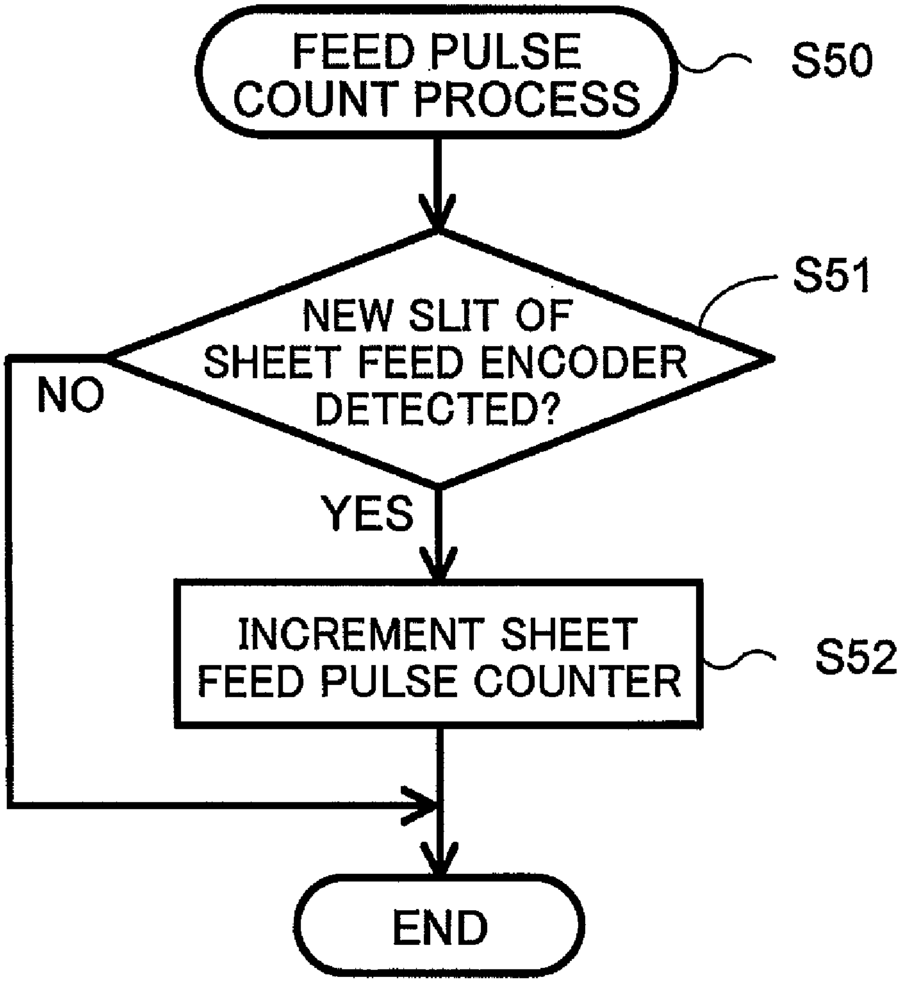
FIG. 15 is a flowchart showing a sheet feed pulse count process executed in the image recording apparatus.

FIG. 15 is a flowchart showing a sheet feed pulse count process (S50) executed in the image recording apparatus 1. The sheet feed pulse count process (S50) shown in FIG. 15 is an interruption process executed regularly in the image recording apparatus 1. The sheet feed pulse count process (S50) is executed at predetermined intervals which is set to be sufficiently shorter than a period required for the sheet feed rotation slit 16*a* of the sheet feed encoder 16 rotated by an interval of one slit.

First of all, whether or not a new slit of the sheet feed encoder 16 is detected is determined (S51). When the sheet feed encoder 16 detects the new slit (S51: Yes), the value of the sheet feed pulse counter 83*a* (See FIG. 12) is incremented by one (S52), and the sheet feed pulse count process is ended. In contrast, when the new slit of the sheet feed encoder 16 is not detected (S51: No), the sheet feed pulse count process is ended. The number of detected slits of the sheet feed encoder 16 is stored in the sheet feed pulse counter 83*a* by the sheet feed pulse count process.

In the embodiment, when the printing paper P is fed from the sheet feed tray 7 by the sheet feed roller 11, the sheet feed roller 11 is continuously rotated in the normal direction. Then, as shown in FIG. 16A, at a moment when the trailing edge of the preceding printing paper P1 has left from the press-contact position of the sheet feed roller 11, the following printing paper P2 is fed by the rotation of the sheet feed roller 11. Therefore, overlap of the trailing portion of the preceding printing paper P1 and the leading portion of the following printing paper P2 along the direction of conveyance is generated. However, by setting the difference (V1−V2) between the peripheral velocity V1 of the intermediate roller 25*a* and the peripheral velocity V2 of the sheet feed roller 11 (V1>V2) to be a value not smaller than a predetermined value, an adequate clearance (sheet distance) may be formed between the trailing edge of the preceding printing paper P1 and the following printing paper P2 before it reaches the sheet sensor 28.

Although the invention has been described on the basis of the embodiment, it is easily supposed that the invention is not limited to the embodiment described above, and various improvements and modifications may be made without departing the scope of the invention.

For example, in the embodiment, when the image data to the following printing paper P2 is not stored, the printing paper P2 is conveyed to the press-contact position of the sheet feed roller 11 on the sheet feed tray 7 via the returning section 40 by the conveying path switching mechanism 50 in order to return the following printing paper P2 reliably to the sheet feed tray 7, a configuration in which the conveying path switching mechanism 50 and the returning section 40 are used may be achieved also in a case where the image recording apparatus 1 has a duplex recording function. In this case, when the image is recorded on a first side of the printing paper P, the printing paper P may be conveyed in the same manner as in Steps S27 to S33 shown in FIG. 14. Then, when recording the image on a second side of the printing paper P returned to the sheet feed tray 7, the process shown in FIG. 13 may be performed.

Figure 20A:
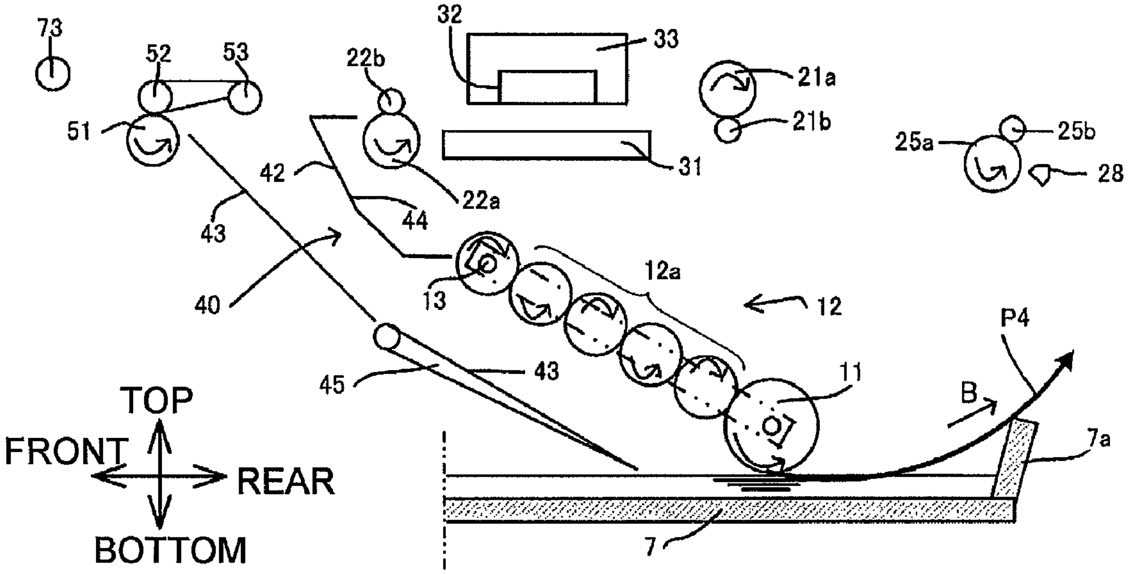
FIG. 20A is a drawing showing the travel of the printing paper by a duplex recording function executed by the image recording apparatus.
Figure 20B:
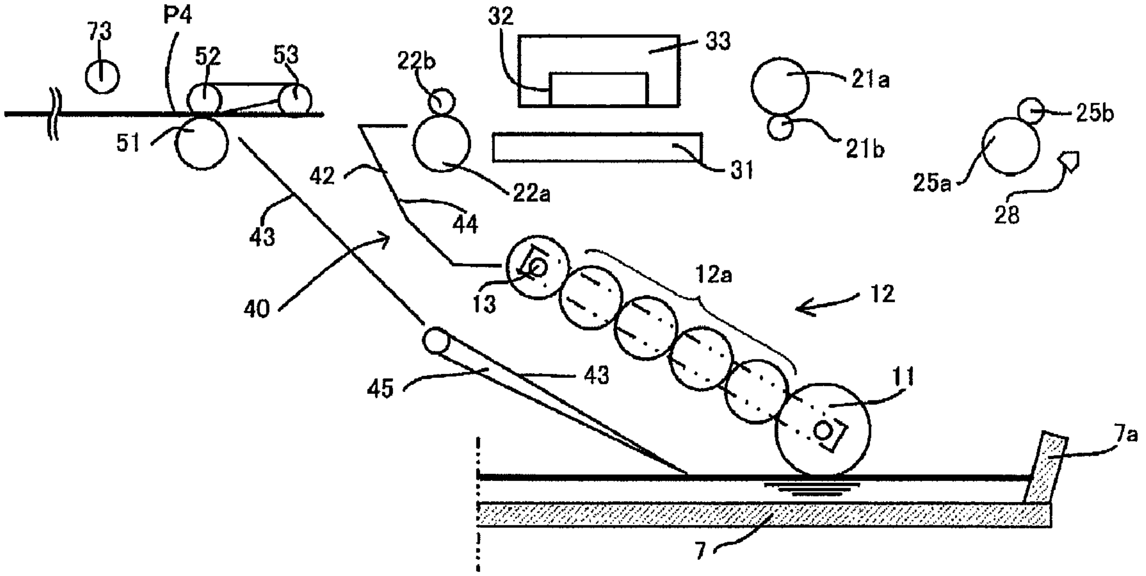
FIG. 20B is a drawing showing the travel of the printing paper by the duplex recording function executed by the image recording apparatus.
Figure 20C:
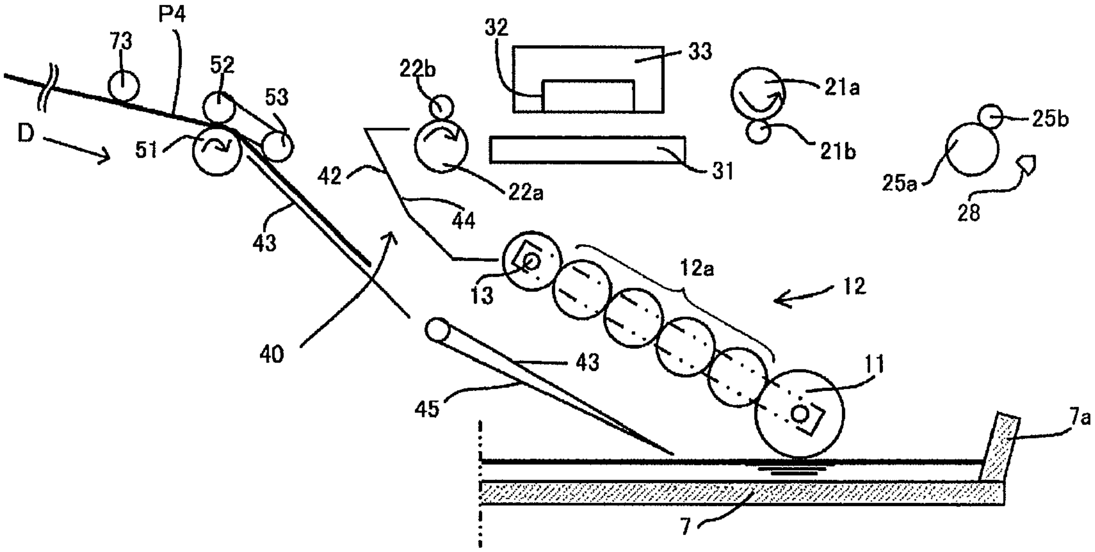
FIG. 20C is a drawing showing the travel of the printing paper by the duplex recording function executed by the image recording apparatus.
Figure 20D:
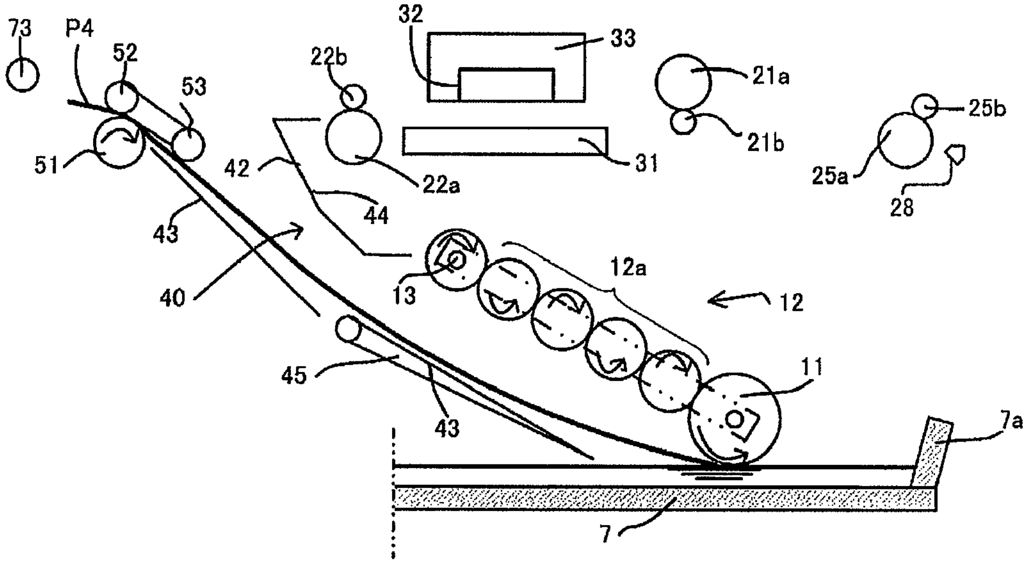
FIG. 20D is a drawing showing the travel of the printing paper by the duplex recording function executed by the image recording apparatus.
Figure 20E:
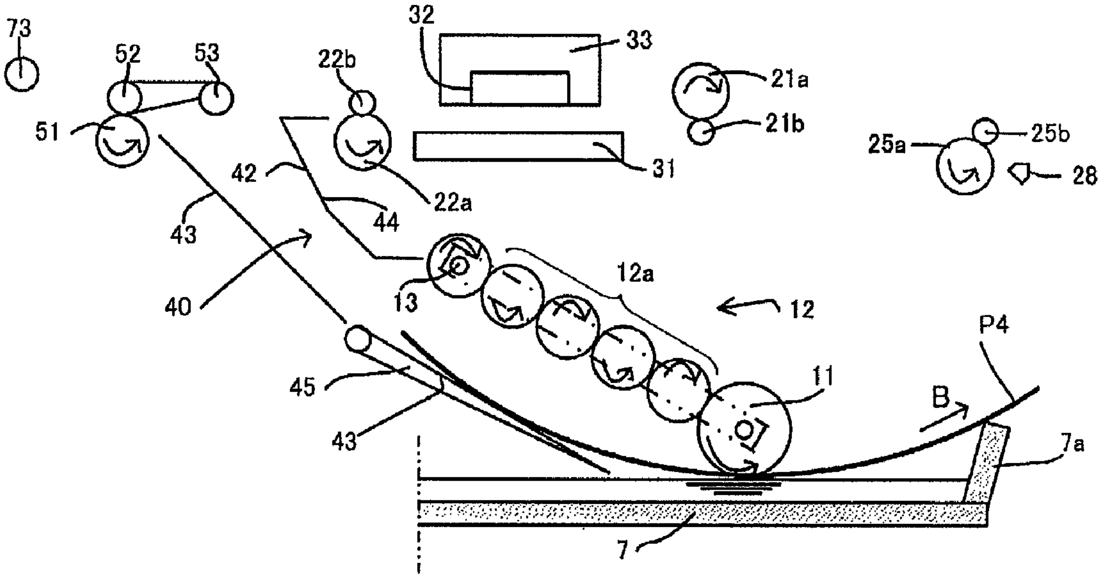
FIG. 20E is a drawing showing the travel of the printing paper by the duplex recording function executed by the image recording apparatus.
Figure 20F:
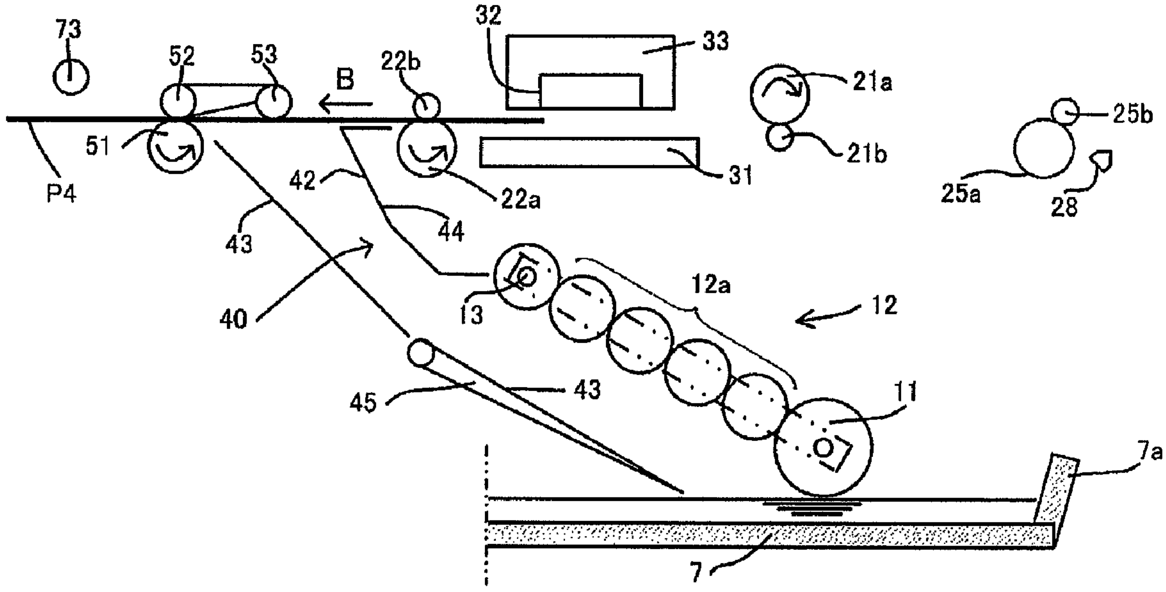
FIG. 20F is a drawing showing the travel of the printing paper by the duplex recording function executed by the image recording apparatus.

Here, the operation of the image recording apparatus 1 at the time of the duplex recording function according to the embodiment will be described with reference to FIGS. 20A to 20F. For example, as shown in FIG. 20A, when recording the image on both sides of a printing paper P4 fed from the sheet feed tray 7, when the trailing edge of the printing paper P4 on which the image is recorded on a front surface thereof by the printhead 32 reaches the auxiliary rollers 53 as shown in FIG. 20B, the conveying path switching mechanism 50 is changed in position from the first position to the second position as shown in FIG. 20C, and the printing paper P4 is conveyed to the returning section 40 by the reverse rotation of the first switching roller. Subsequently, as shown in FIG. 20D, when the trailing edge of the printing paper P4 reaches the press-contact position of the sheet feed roller 11, the sheet feed roller 11 is rotated in the normal direction (the sheet feed direction), and the printing paper P4 is fed upstream of the conveying path 15 again as shown in FIG. 20E. Then, the printing paper P4 is conveyed onto the platen 31 via the intermediate roller 25*a* and the conveying roller 21*a*, and an image is also recorded on another surface (back surface) by the printhead 32. Then, as shown in FIG. 20F, the printing paper P4 having the images recorded on the both sides is output to the sheet output tray 8 by the conveying path switching mechanism 50 switched from the second position to the first position by the normal rotation of the conveying motor 23. Accordingly, the duplex recording to the printing paper P4 is achieved.

In the embodiment, the position of the printing paper P1 and the positions of the printing papers P2 and P3 conveyed subsequently are calculated by the amount of rotation of the sheet feed roller 11, and the mechanism for returning the printing papers P2 and P3 to the sheet feed tray 7 is controlled according to the result of calculation. However, the invention is not limited thereto, and the detection may be achieved by other configurations. For example, the position of the following printing paper P2 or P3 may be determined by whether or not the sensor 28 is turned ON. Alternatively, a configuration in which a plurality of sheet sensors are arranged at predetermined intervals in the conveying path 15 and the respective mechanisms are controlled so as to return the printing papers P2 and P3 to the sheet feed tray 7 according to the sensed result from the sheet sensors between ON and OFF is applicable.

In the embodiment, the sequence to return the printing paper P2 to the sheet feed tray is different depending on whether or not the trailing edge of the printing paper P2 is located downstream from the sheet feed roller 11. However, the printing paper P2 may be conveyed to the contact-pressure position of the sheet feed roller 11 on the sheet feed tray 7 via the returning section 40 by the conveying path switching mechanism 50 irrespective of whether or not the trailing edge of the printing paper P2 is located downstream of the sheet feed roller 11.

In the embodiment, since the trailing edge of the printing paper P2 is returned to the sheet feed tray 7 as a new leading edge by the conveying path switching mechanism 50, the upward-oriented surface of the printing paper P2 returned to the sheet feed tray 7 is different from the upward-oriented surface of the same before being fed from the sheet feed tray 7. Alternatively, the conveying path switching mechanism 50 may be configured to convey the printing paper P2 to the returning section 40 from the leading edge. In this case, the upward-oriented surface of the printing paper P2 returned to the sheet feed tray 7 is the same as the upward-oriented surface of the same before being fed from the sheet feed tray 7.

In the embodiment, the sheet feed tray 7 is positioned below the recording mechanism 30. However, the invention is not limited thereto. The sheet feed tray 7 can be positioned above or beside the recording mechanism 30.

In the embodiment, the recording mechanism 30 is of an ink-jet recording system. However, other recording systems (for example, electrophotographic system, thermal system, etc.) are also applicable.

In the embodiment, whether or not image data is stored in the RAM 83 is determined by making an attempt to receive the image data for the following sheet P2. However, the image data may be those received from the external apparatus for printing or those received by the facsimile transmission. In addition, by determining whether or not the image data of a document scanned by the scanner unit 6 is stored in the RAM 83, it can be applied to the copying function as well. The determination whether the image data is stored in the RAM 83 may be performed by determining whether or not the image data of the entire page is stored, or by determining whether or not at least part of the image data is stored.

While the invention has been described in connection with embodiments, it will be understood by those skilled in the art that other variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the following claims.

What is claimed is:

1. An image recording apparatus comprising:

a sheet feed tray configured to store a plurality of stacked recording medium;

a sheet feed roller configured to feed the plurality of recording medium, one by one, from the sheet feed tray;

an image recording unit configured to record an image on the recording medium fed by the sheet feed roller;

an output unit configured to output the recording medium recorded by the image recording unit;

a first conveying unit configured to convey the recording medium from the sheet feed tray to the output unit via the image recording unit;

a second conveying unit configured to return the recording medium, which has conveyed via the image recording unit, to the sheet feed tray;

an image memory configured to store image data to be recorded by the image recording unit; and a controller configured to control the sheet feed roller, the image recording unit, the first conveying unit, and the second conveying unit to record the image on the recording medium; and a detection unit configured to detect a position of the recording medium with respect to the sheet feed tray, wherein the controller is configured to control the sheet feed roller to start feeding a following recording medium subsequent to a preceding recording medium fed by the sheet feed roller irrespective of whether the image data for the following recording medium is stored in the image memory, wherein the controller is configured to determine whether the image data for the following recording medium is stored in the image memory after having started the sheet feeding of the following recording medium, and whether first and second following recording media had been fed from the sheet feed tray, wherein, when the controller determines that an image data for the following recording medium fed from the sheet feed tray is not stored in the image memory and that a trailing edge of the first following recording medium has passed the sheet feed roller, the controller is configured to control the first conveying unit and the second conveying unit to return the first following recording medium to the sheet feed tray by conveying the first following recording medium through the image recording unit and the second conveying unit, and wherein, when the controller determines that an image data for the following recording medium fed from the sheet feed tray is not stored in the image memory and that the trailing edge of the second following recording medium has not passed the sheet feed roller, the controller is configured to control the sheet feed roller to return the second following recording medium to the sheet feed tray without passing through the image recording unit and the second conveying unit.

2. The image recording apparatus according to claim 1, further comprising a switching roller being capable of rotating in normal and reverse directions, wherein the controller controls the switching roller to rotate in the normal direction when outputting the recording medium, which has passed the image recording unit, to the output unit, and controls the switching roller to rotate in the reverse direction when returning the recording medium, which has passed the image recording unit, to the sheet feed tray via the second conveying unit.

3. The image recording apparatus according to claim 2, wherein the controller further configured to perform a duplex image recording, and in the duplex image recording control, the controller is configured to perform recording an image on a first surface of the recording medium fed from the sheet feed tray by the image recording unit, then returning the recording medium to the sheet feed tray via the second conveying unit, feeding the returned recording medium again from the sheet feed tray, recording an image on a second surface of the re-fed recording medium by the image recording unit, and outputting the recording medium, which is recorded on the second surface, to the output unit.

4. The image recording apparatus according to claim 1, wherein the sheet feed roller is configured to be rotatable in normal and reverse directions, and the controller is configured to, if the controller determines that the trailing edge of the following recording medium has not passed the sheet feed roller, rotate the sheet feed roller in the reverse direction to return the following recording medium to the sheet feed tray.

5. The image recording apparatus according to claim 1, wherein the detection unit includes a counter configured to count the amount of rotation of the sheet feed roller.

6. The image recording apparatus according to claim 5, wherein the detection unit further includes a rotary encoder configured to output the amount of rotation of the sheet feed roller.

7. The image recording apparatus according to claim 1, wherein the following recording medium is returned to the sheet feed tray via a position opposite to a position where the recording medium fed from the sheet feed tray passes when the trailing edge of the following recording medium has passed the sheet feed roller.

8. The image recording apparatus according to claim 1, wherein an upward-oriented surface of the following recording medium returned to the sheet feed tray is a different from an upward-oriented surface of the same before initially being fed from the sheet feed tray when the trailing edge of the following recording medium has passed the sheet feed roller.

9. The image recording apparatus according to claim 1, wherein the sheet feed tray is positioned below the image recording unit.

* * * * *